United States Patent
Matsui et al.

(10) Patent No.: US 8,533,534 B2
(45) Date of Patent: Sep. 10, 2013

(54) INFORMATION GENERATING APPARATUS AND INFORMATION GENERATING METHOD

(75) Inventors: Kazuki Matsui, Kawasaki (JP); Shingo Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 12/911,929

(22) Filed: Oct. 26, 2010

(65) Prior Publication Data

US 2011/0099433 A1   Apr. 28, 2011

(30) Foreign Application Priority Data

Oct. 28, 2009 (JP) .................................. 2009-248206

(51) Int. Cl.
*G06F 11/00* (2006.01)
(52) U.S. Cl.
USPC ............ 714/38.11; 714/22; 714/48; 713/320; 713/340
(58) Field of Classification Search
USPC ................... 714/22, 48, 38.11; 713/320, 340
See application file for complete search history.

(56) References Cited

U.S. PATENT DOCUMENTS

| | | | |
|---|---|---|---|
| 7,197,656 B2 * | 3/2007 | Nguyen et al. ................ | 713/340 |
| 7,289,166 B2 | 10/2007 | Kimura | |
| 8,245,062 B1 * | 8/2012 | Nanda et al. .................. | 713/320 |
| 8,250,384 B2 * | 8/2012 | Borghetti et al. ............. | 713/300 |
| 2005/0060670 A1 * | 3/2005 | Inui et al. ...................... | 715/867 |
| 2005/0114721 A1 * | 5/2005 | Azadet et al. ................. | 713/320 |
| 2008/0057894 A1 * | 3/2008 | Aleksic et al. ............. | 455/187.1 |
| 2008/0263398 A1 | 10/2008 | Mori et al. | |
| 2010/0174928 A1 * | 7/2010 | Borghetti et al. ............. | 713/320 |
| 2010/0331057 A1 | 12/2010 | Tanaka | |

FOREIGN PATENT DOCUMENTS

| | | |
|---|---|---|
| JP | 10-32933 A | 2/1998 |
| JP | 10-82844 A | 3/1998 |
| JP | 2005-080385 A | 3/2005 |
| JP | 2006-350481 | 12/2006 |
| JP | 2008-271126 A | 11/2008 |
| JP | 2009-181366 | 8/2009 |

OTHER PUBLICATIONS

Japanese Office Action mailed May 21, 2013 for corresponding Japanese Application No. 2009-248206, with English-language translation.

* cited by examiner

*Primary Examiner* — Charles Ehne
(74) *Attorney, Agent, or Firm* — Fujitsu Patent Center

(57) ABSTRACT

An information generating apparatus, includes: a process executing part that executes at least one process using a battery as a power source; a power detecting part that detects power consumption of the battery; a consumption determining part that determines whether the power consumption is equal to or more than a specified threshold; an acquisition part that specifies a process executed by the process executing part when the power consumption is equal to or more than the specified threshold; and a generating part that generates execution state information about the specified process.

10 Claims, 24 Drawing Sheets

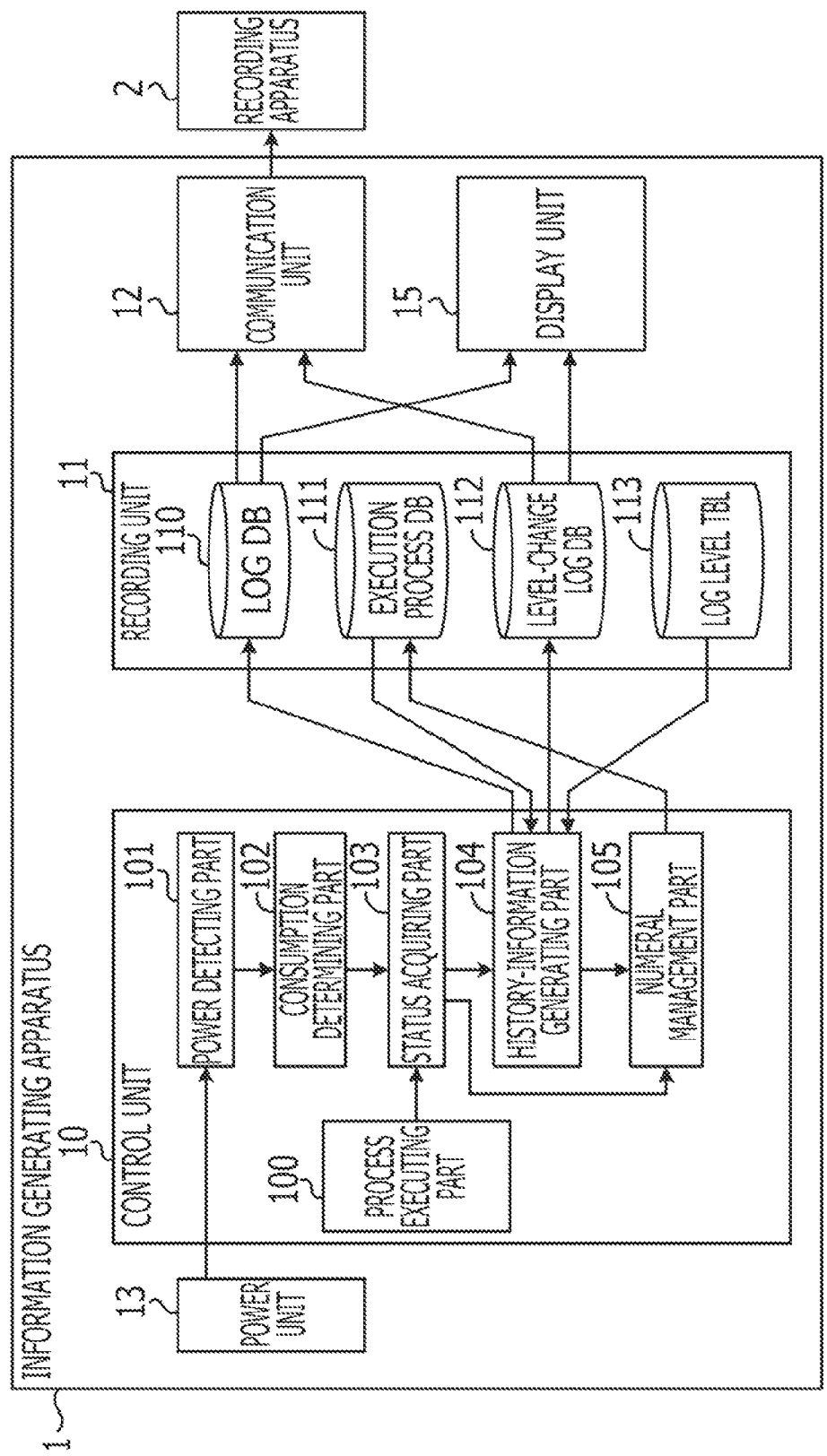

FIG. 4A

| PROCESS ID | EVENT-OCCURRING TIME | EVENT CONTENT |
|---|---|---|
| 00001002 | 09/09/11_08:32:24 | START |
| 00001002 | 09/09/11_08:33:22 | END |
| 00001011 | 09/09/11_09:23:23 | START |
| 00001025 | 09/09/11_09:25:22 | START |

FIG. 4B

| PROCESS ID | EVENT-OCCURRING TIME | EVENT CONTENT |
|---|---|---|
| 00001002 | 09/09/11_08:32:24 | START |
| 00001002 | 09/09/11_08:33:05 | RUN |
| 00001002 | 09/09/11_08:33:22 | END |
| 00001011 | 09/09/11_09:23:23 | START |

FIG. 4C

| |
|---|
| 1000 : 41 42 20 40 00 00 00 00 00 00 00 00 00 00 00 |
| 1010 : 00 00 00 00 00 00 00 00 00 00 00 00 00 00 00 |
| 1020 : 21 00 40 11 00 C0 01 00 05 ED B0 00 3E FF FE FF |
| 1030 : CD C3 00 C3 80 C0 CD 9F 00 FE 31 CA 00 C2 FE 32 |

FIG. 5

| PROCESS | DETECTION TIME | POWER CONSUMPTION | POINT | ACCUMULATED POINT |
|---|---|---|---|---|
| GAME1 | 09/09/10_13:31:15 | 0.13 | 0.5 | 30.0 |
| ONE-SEG | — | — | — | 0 |
| MAIL | 09/09/11_08:32:24 | 0.13 | 1.0 | 2.0 |
| BROWSER | — | — | — | 0 |

FIG. 6

| INQUIRY TIME | RESULT | TARGET PROCESS | LOG LEVEL |
|---|---|---|---|
| 09/09/10_13:21:20 | YES | GAME1 | 1 |

FIG. 7

| LOG LEVEL | LEVEL REFERENCE VALUE | OUTPUT FORM |
|---|---|---|
| 0 | — | EXECUTION START TIME · EXECUTION END TIME |
| 1 | 30 | EXECUTION START TIME · EXECUTION END TIME · EXECUTION STATUS |
| 2 | 1000 | MEMORY IMAGE DUMP LIST |

FIG. 15

| DETECTION TIME | STATE | REMAINING POWER AMOUNT (VOLTAGE) |
|---|---|---|
| 09/09/11_08:33:05 | 0 | 3.450V |
| 09/09/11_08:33:22 | 0 | 3.440V |
| 09/09/11_09:23:23 | 1 | 3.220V |

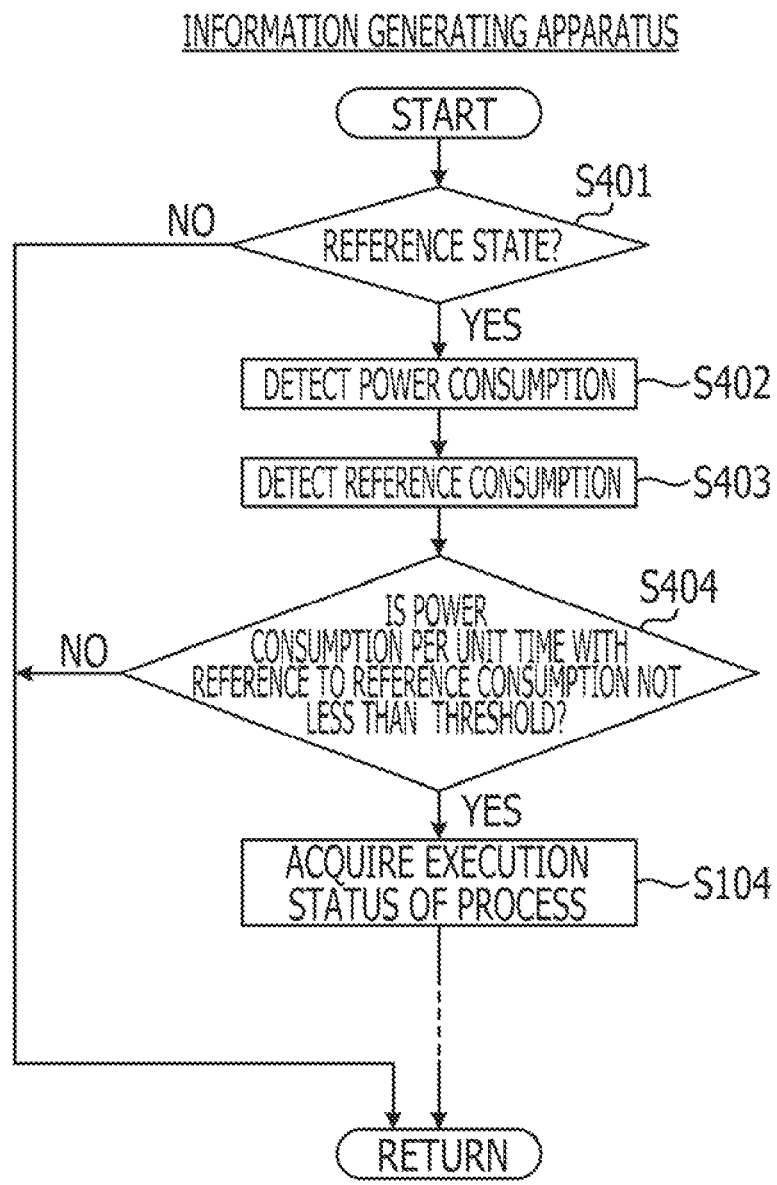

FIG. 21

| APPARATUS STATE | POINT |
|---|---|
| REFERENCE STATE | 1.0 |
| IN HIGH-SPEED MOVEMENT | 0.5 |
| IN CONVERSATION | 0.2 |
| IN COMMUNICATION | 0.1 |

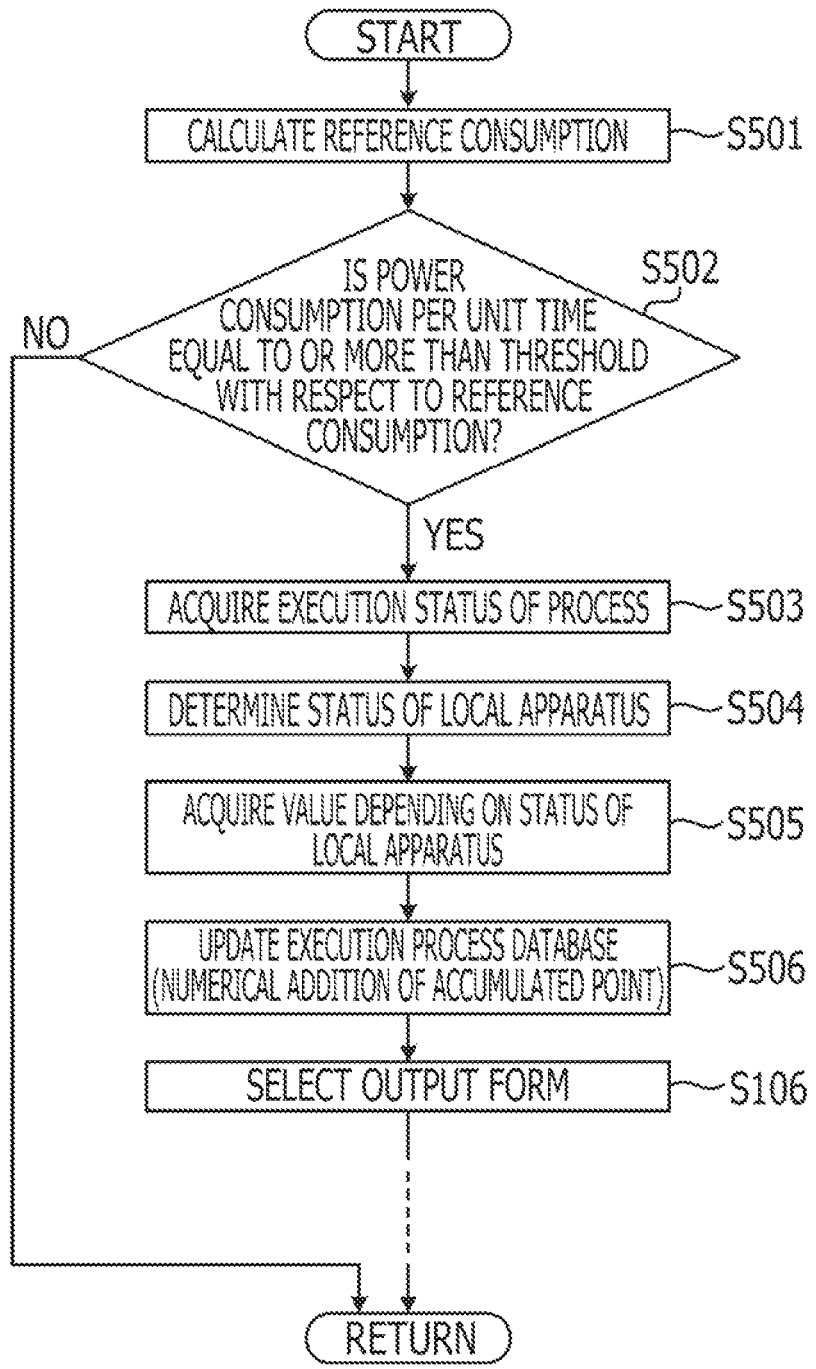

INFORMATION GENERATING APPARATUS AND INFORMATION GENERATING METHOD

CROSS-REFERENCE TO RELATED APPLICATIONS

This application is based upon and claims the benefit of priority of the prior Japanese Patent Application No. 2009-248206, filed on Oct. 28, 2009, the entire contents of which are incorporated herein by reference.

FIELD

Embodiments discussed herein related to an information generating apparatus and an information generating method in which information about power consumption may be attained.

BACKGROUND

Terminal devices, such as mobile phones, using batteries as their power sources have been provided with an increased number of functions, applications and/or operations, for example. At least partly because of the increased use and functionality of these devices, there has been an increase in the number of cases where the users consider that the devices are malfunctioning. In these cases, the users send the device for return or repair.

Some malfunctions or perceived malfunctions may be due to rapid battery consumption.

A battery monitoring device with an improved accuracy for representing the remaining capacity of a battery has been disclosed (see, for example, Japanese Laid-open Patent Application Publication No. 10-32933).

SUMMARY

According to an aspect of an embodiment, an information generating apparatus includes a process executing part that executes at least one process using a battery as a power source, a power detecting part that detects power consumption of the battery, a consumption determining part that determines whether the power consumption is equal to or more than a specified threshold, an acquisition part that specifies a process executed by the process executing part when the power consumption is equal to or more than the specified threshold, and a generating part that generates execution state information about the specified process.

According to an aspect of an embodiment, malfunctions and/or perceived malfunctions may be reduced by obtaining information regarding battery power consumption.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an exemplary functional configuration of the information generating apparatus according to Embodiment 1;

FIGS. 4A to 4C illustrate exemplary record contents of a log database of the information generating apparatus according to Embodiment 1;

FIG. 5 illustrates an exemplary record content of an execution process database of the information generating apparatus according to Embodiment 1;

FIG. 6 illustrates an exemplary record content of a level-change log database of the information generating apparatus according to Embodiment 1;

FIG. 7 illustrates an exemplary record content of a log level table of the information generating apparatus according to Embodiment 1;

FIG. 15 illustrates an exemplary record content of a state log database of the information generating device according to Embodiment 2;

FIG. 18 is a flow chart illustrating an exemplary process for determining a log level of the information generating apparatus according to Embodiment 2;

FIG. 21 illustrates an exemplary record content of a state-specific point table of the information generating apparatus according to Embodiment 3;

FIG. 22 is a flow chart illustrating an exemplary process for determining a log level of the information generating apparatus according to Embodiment 3;

DESCRIPTION OF EMBODIMENTS

A cause of accelerated decrease in battery life may be power consumption due to execution of an undesired process by a design basis fault of the user, for example. Alternatively, a cause of accelerated decrease in battery life may be power consumption due to abnormal execution of an application program, which is equal to or more than one expected to be consumed during normal execution of an application program. One of countermeasures to cope with the terminal device considered to be failure may be to find a cause for an increase in power consumption. Hereinafter, the technical contents of the embodiments will be described with reference to the attached drawings that represent the respective embodiments. Any of the embodiments may be applied to a terminal device. Examples of terminal devices include, but are not limited to, a mobile phone, a hand-held personal computer, a personal digital assistance (PDA), for example. The terminal device includes a battery, such as a secondary buttery (e.g., a storage battery or a rechargeable battery) as a power source. The information generating apparatus of the embodiment may facilitate an analysis of the cause of power consumption based on the generation of history information about execution history in different forms depending on the amounts of power consumption. The history information may be output by a suitable method.

Figure 1:
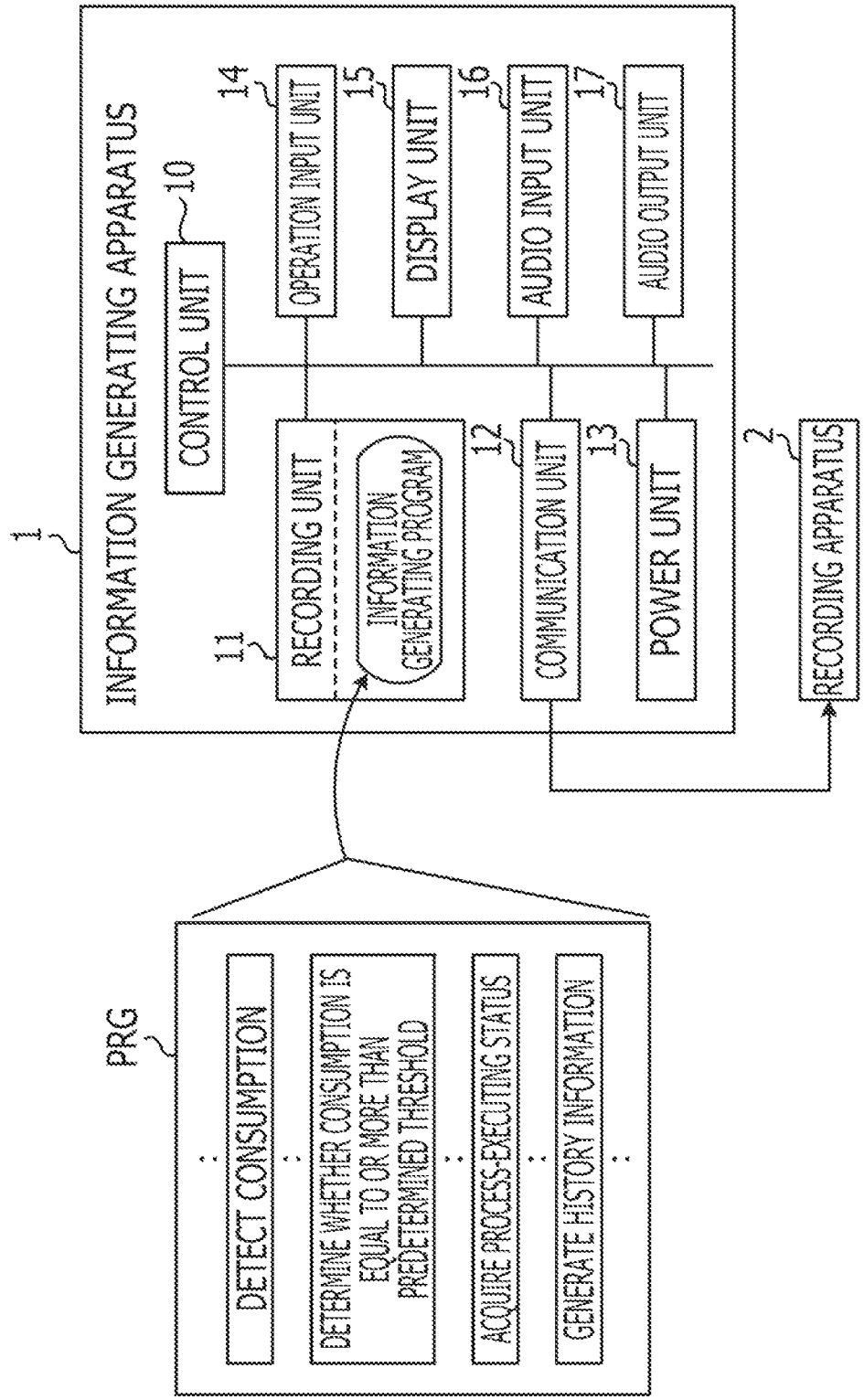
FIG. 1 illustrates an exemplary hardware constitution of an information generating apparatus according to Embodiments.

First, the hardware configuration of an information generating apparatus according to Embodiments will be described. FIG. 1 illustrates an exemplary hardware constitution of an information generating apparatus according to Embodiments. In FIG. 1, reference numeral 1 denotes an information generating apparatus using a portable terminal device, such as a mobile phone, for example. The information generating apparatus 1 includes various kinds of mechanisms, such as a control unit 10, a recording unit 11, a communication unit 12, a power unit 13, an operation input unit 14, a display unit 15 an audio input unit 16, and an audio output unit 17.

The control part 10 is a calculation mechanism, such as a central processing unit (CPU) that controls the entire apparatus. The control unit 10 is connected to individual hardware units of the information generating apparatus 1 through internal communication lines and executes a process according to procedures of various programs including an information generating program PRG. The control unit 10 includes various kinds of circuits, such as an instruction register, an instruction decoder, an arithmetic logic unit, an accumulator, an address register, and a program counter, for example. The instruction register temporarily stores an instruction read from the recording unit 11. The instruction decoder decodes a machine instruction (binary numeral) and then controls the individual hardware units of the information generating apparatus 1 in response to the instruction. The arithmetic circuit performs arithmetical operations, such as addition, subtraction, and numerical comparison. The accumulator temporally stores information about calculation target data, calculation results, and so on. The address register stores the addresses of the respective recording areas in the recording unit 11, where the control unit 10 performs read and write operations. The program counter shows the address of the recording area of the recording unit 11 where a next instruction to be executed is stored. In addition, the control unit 10 includes a timer that measures a time interval.

The recording unit 11 is a main storage mechanism, such as a synchronous dynamic random access memory (SDRAM) or a static random access memory (SRAM). The recording unit 11 may further include a magnetic recording mechanism, such as a hard disk drive (HDD) or a nonvolatile semiconductor recording mechanism, such as a solid state disk (SSD) as an auxiliary recording mechanism. The recording unit 11 stores an information generating program PRG of the present embodiment. In other words, the information generating program PRG stored in the recording unit 11 is executed under the control of the control unit 10 to realize various kinds of functions of the information processing apparatus 1. The recording unit 11 stores not only the information generating program PRG of the present embodiment but also various application programs that execute various processes. These various programs may be executed in parallel.

The communication unit 12 is a mechanism that establishes a wireless connection to a communication network, such as a mobile phone network, through a wireless communication with communication bases stations. For example, the communication unit 12 may be constructed of hardware, such as various circuits, and software, such as a firmware. The communication base stations are arranged at a specified distance from one another and form their respective wireless communication areas. The communication unit 12 carries out a process for establishing a wireless connection with a single connectable communication base station or with one selected from two or more connectable communication base stations, for example, based on their respective wireless signal strengths. If the information generating apparatus 1 moves out of the communication area of one communication base station with which wireless communication has been established or moves into the communication area of another communication base station from which signals stronger than those of the former communication base station, the communication unit 12 carries out a process for establishing wireless communication with the another communication base station within a specified time. Therefore, if the information generating apparatus 1 moves at high speed, a process for establishing wireless connection with many communication base stations within a specified time may be performed. Furthermore, the information generating apparatus 1 establishes communication with a recording apparatus 2, such as an external server computer, through a communication network from the communication unit 12, followed by sending various kinds of information to the recording apparatus 2. Furthermore, the communication unit 12 may be constructed of mechanisms based on various communication standards, such as various circuits for short-distance wireless communication (e.g., infrared ray communication and Bluetooth), and various circuits for wired communication.

The power unit 13 may be constructed as a mechanism for housing a secondary battery, such as a lithium ion battery or a nickel hydride battery, and supplying the electric power of the housed secondary battery to another mechanism through an internal electric power line. For example, the power unit 13 may have a function of measuring the voltage of the secondary battery to detect the remaining power amount of the battery based on the measured voltage and also detect the amount of power consumption based on the successive measurement of the remaining power amount. Furthermore, using a power source based on the standard of a smart battery or the like where a nickel hydride battery body and a control circuit are installed in a package, the remaining power amount or consumption of the battery may be detected based on a signal output from the control circuit.

Furthermore, the power source may be any of primary batteries, such as an alkaline manganese battery, an oxyride battery, and a lithium battery, for example.

Figure 2:
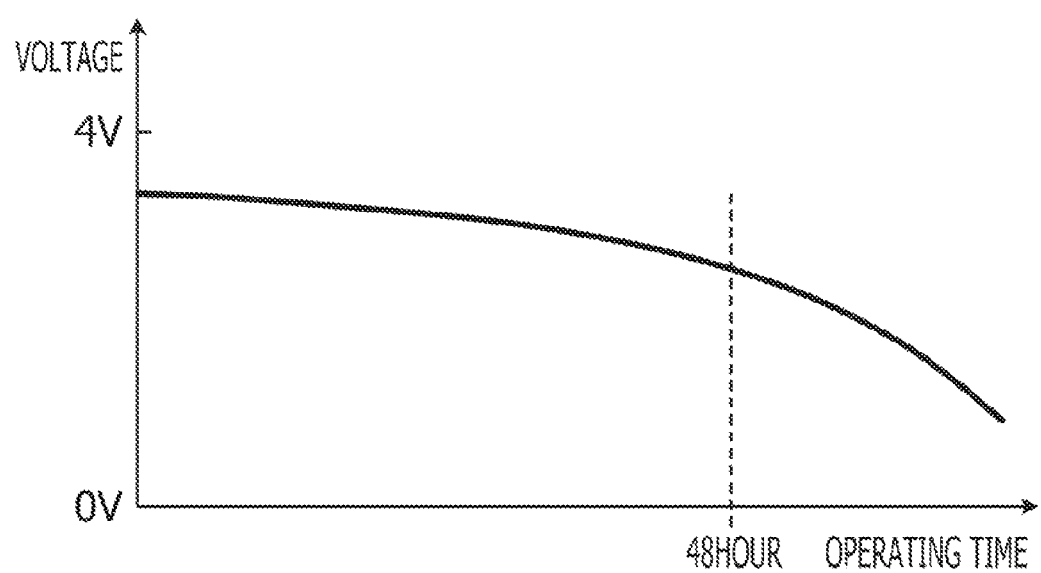
FIG. 2 is a graphic diagram illustrating an exemplary discharge characteristic of a battery used in the information generating apparatus according to Embodiment 1.

FIG. 2 is a graphic diagram illustrating an exemplary discharge characteristic of the battery used in the information generating apparatus according to Embodiment 1. In FIG. 2, the horizontal axis represents the operating time of the battery and the vertical axis represents the voltage thereof to show the relationship therebetween. As illustrated in FIG. 2, the battery discharges with the passage of operating time. Thus, the voltage of the battery decreases as the power thereof is consumed.

Referring again to FIG. 1, the operation input unit 14 is an interface mechanism to be operated by the user. In response to the operation of the user, the operation input unit 14 outputs a signal to the control unit 10 through an internal communication line. The operation input unit 14 may be a mechanism constructed of various keys, a touch panel, and the attached circuits thereof. The display unit 15 is an interface mechanism that outputs information.

For example, the display unit 15 may be a mechanism constructed of a liquid crystal display that outputs a video in response to a control instruction from the control unit 10, the attached circuits thereof, and so on.

The audio input unit 16 is an interface mechanism that receives an audio input. For example, the audio input unit 16 may be a mechanism constructed of a microphone and the attached circuits thereof to receive a sound from the outside and convert the sound into a digital signal. Subsequently, the converted digital signal is output to the control unit 10 through the internal communication line.

The audio output unit 17 is an interface mechanism that outputs a sound. For example, the audio output unit 17 may be a mechanism constructed of a speaker, the attached circuits thereof, and so on to receive a digital audio signal from the control unit 10 through the internal communication line. Subsequently, the received digital audio signal is output as an analog signal to the outside.

Next, a functional configuration of the information generating apparatus 1 of Embodiment 1 will be described.

FIG. 3 illustrates an exemplary functional configuration of the information generating apparatus 1 according to Embodiment 1. The information generating apparatus 1 executes an information generating program PRG under the control of the control unit 10 to realize the functions of a process executing part 100, a power detecting part 101, a consumption determining part 102, a status acquiring part 103, a history-information generating part 104, a numeral management part 105, and so on. Alternatively, instead of executing the information generating program PRG, the control unit 10 may include a circuit that realizes the functions of a process executing part 100, a power detecting part 101, a consumption determining part 102, a status acquiring part 103, a history-information generating part 104, and a numeral management part 105.

The process executing part 100 is a function that outputs various kinds of instructions, such as instructions for initiating the execution of various processes and instructions for terminating the processes. In other words, it is a function realized by executing a program module, a circuit, or the like in the control unit 10. For example, the process executing part 100 outputs instructions, such as an instruction for executing an application program stored in the recording unit 11 and an instruction for executing a process for scanning communication base stations to find one connectable to the communication unit 12 and establishing the connection between them.

The power detecting part 101 is a function that detects the power consumption of a battery housed in the power unit 13. In other words, it is a function realized by executing a program module or a circuit in the control unit 10. For example, the power detecting part 101 receives the voltage level of the battery, which is detected by the power unit 13, as the remaining power amount of the battery. Then, the power detecting part 101 calculates a variation in remaining power amount to determine the power consumption of the battery. If the power unit 13 employs a power source based on the standard of a smart battery or the like, the power detecting part 101 may also detect the power consumption of the battery by receiving the remaining power amount or consumption of the battery output from the power unit 13.

The consumption determining part 102 is a function that determines whether the power consumption of the battery per unit time detected by the power detecting part 101 is equal to or more than a specified threshold. In other words, it is a function realized by executing a program module or a circuit in the control unit 10.

The status acquiring part 103 is a function that acquires a status of executing a process by the process executing part 100 when the consumption determining part 102 determines that the consumption of the battery is equal to or more than a specified threshold. In other words, it is a function realized by executing a program module or a circuit in the control unit 10. The status acquiring part 103 confirms various kinds of registers and circuits installed in the control unit 10 and then the information about a status of each of various kinds of processing, for example, whether the process is executed, when the process is initiated or terminated, what kind of an instruction is executed, or the like. Furthermore, for example, the status acquiring part 103 may acquire the data expanded on the register as a dump list of memory images. Furthermore, a memory image, which is expanded on the recording unit 11, may also acquire a memory image expanded on the recording unit 11.

The history-information generating unit 104 is a function that generates the history information about the history of process execution based on the execution status acquired by the status acquiring part 103. In other words, it is a function realized by executing a program module or a circuit in the control unit 10. The history-information generating part 104 generates information based on the information acquired by the status acquiring part 103. The information may be history information to be used for analyzing the instruction under execution, the dump list, and so on.

The numeral management part 105 is a function that manages numerical values to be stored on various databases described later. In other words, it is a function realized by executing a program module or a circuit in the control unit 10. The numeral management part 105 works out a numerical value depending on the process execution status and the addition and subtraction are then performed on the accumulated points of the execution process database 111, which will be described later, based on the calculated numerical value.

Furthermore, the information generating apparatus 1 executes the information generating program PRG under the control of the control unit 10. Thus, part of the recording area of the recording unit 11 operate as information recording areas for a log database (log DB) 110, an execution process database (execution process DB) 111, a level-change log database (level-change log DB) 112, a log level table (log level TBL) 113, and so on.

The log database 110 is a database that stores history information generated from the history-information generating part 104. The history information is stored as a log on the log database 110. Furthermore, the form of the history information to be stored depends on the log level described later. For example, it may be suitably changed to any of the information about the execution status of each of various processes, such as the start time and the end time, and the instruction being executed, and the dump list expanded on the register. If the information generating apparatus 1 includes two or more recording units 11 as different circuits, each of these recording units 11 secures a recording area to be used as a log database 110. Then, depending on the form of the history information to be recorded, the log database 110 of the recording unit 11 may store the history information.

The execution process database 111 is a database that records information based on the process execution status acquired by the status acquiring part 103. The execution process database 111 stores the information about a process every time the process is executed. Here, this process is executed by the consumption determining part 102 when the power consumption of the power unit 13 is equal to or more than a specified threshold.

The level-change log database 112 is a database that records information about the history or the like with respect to a change in log level to be stored in the log database 110. The term "log level" refers to a level for determining the content and form of a log to be recorded as a log. For example, the log levels are classified into three stages, "0" to "2", and the logs to be stored based on the respective levels are different from one another with respect to the contents and formats of the respective logs.

The log level table 113 is a table that stores information about the standard of a log level representing the output format of a log.

FIG. 4A to FIG. 4C are diagrams illustrating exemplary record contents of the log database 110 of the information generating apparatus 1 according to Embodiment 1.

FIG. 4A shows an example of history information stored as a log at a log level of "0". If the log level is "0", then the history information is stored as a record in which a process ID that specifies a program for the process to be executed or a module included in the program, a time of occurrence of an event, such as a program, and the content of such an event, which correspond to one another. The events at a log level of "0" are the execution start and execution end of the program or the like.

FIG. 4B shows an example of history information stored as a log at a log level of "1". The record contents at a log level of "1" are same as those at a log level of "0" and then stored as a record corresponding to a process ID, an event-occurring time, and event contents. Events at a log level of "1" include "in execution (RUN)" as well as "execution start" and "execution end".

FIG. 4C shows an example of history information stored as a log at a log level of "2". A record content in case a log level is "2" is a dump list of the memory image which acquired the data developed on various registers.

FIG. 5 illustrates an exemplary record content of an execution process database 111 of the information generating apparatus 1 according to Embodiment 1. For example, the execution process database 111 stores data, such as a detection time, a power consumption, a point (score), and an accumulated point (accumulated score), which correspond to each process. Here, the item "process" records the name of a process to be managed. The term "process" basically refers to an application program being activated. Thus, a process carried out by an audio communication, a data communication, and a dedicated communication circuit for a process for scanning base stations to find a connectable base station. The item "detection time" records a time at which the consumption determining part 102 has determined that the power consumption of the power unit 13 is equal to or more than a specified threshold. The item "power consumption" records the power consumption of the power unit 13 per unit time. The item "point" records a numerical value. Here, such a numerical value is given when the power consumption of the power unit 13 is equal to or more than a specified threshold. The item "accumulated value" records an accumulated value obtained from given numerical values.

The record content of the execution process database 111 concerning Example 1 is updated whenever it is determined that the power consumption is equal to or more than the specified threshold value. For example, when it is determined that the power consumption is equal to or more than the specified threshold value, the items of detection time, power consumption, and point of a record corresponding to a process being activated at such a time are filled with the corresponding time clock, power consumption per unit time, and numerical value, respectively. The numerical value recorded on the item of point is then added to a numerical value already recorded on the item of accumulated point. In contrast, the data of the items of detection time, power consumption, and point for a record corresponding to an inactivated process is initialized.

FIG. 6 illustrates an exemplary record content of a level-change log database 112 of the information generating apparatus 1 according to Embodiment 1. For example, the level-change log database 112 records a history with a changed log level as data for the items of inquiry time, result, target process, and log level. The information generating apparatus 1 of Example 1 asks the user about permission of changing the log level. The item "inquiry time" records a time at which the user is asked about the permission of changing the log level. The item "result" records a replay input from the user, "Yes" or "No", to the inquiry about the permission. The item "target process" records the name or the like of a process, such as one of an application program, which leads to a change in log level. The item "log level" records a log level after the change. If it is not changed, then the original log level is still recorded. In the example illustrated in FIG. 6, the user is asked for permission of changing the log level. Alternatively, the information generating apparatus 1 may be set so that the log level is automatically changed without inquiry. In this case, the item "inquiry time" records a time at which the long level is changed. In addition, the item "result" is left blank.

FIG. 7 illustrates an exemplary record content of the log level table 113 of the information generating apparatus 1 according to Embodiment 1.

The log level table 113 records, for example, indexes about a log level, a level reference value, and an output form.

The item "log level" previously records data that represents a log level of "0", "1", "2", or the like. The item "level reference value" represents a point that serves as a reference for level change. In the example illustrated in FIG. 7, the level is changed from "0" to "1" when the point has reached "30". In addition, the level is changed from "1" to "2" when the point has reached "1000". The level "0" is an initial value. Thus, the corresponding level reference value is blank. The item "output form" previously records the contents of output forms corresponding to the respective log levels. In the example illustrated in FIG. 7, if the level is "0", then the targets of the recording are the execution start time and execution end time of a process carried out by an application program or the like. If the level is "1", then the targets of the recording include the execution status of a process. In other words, it may be "in execution" as a result of determining whether the execution of the process is being kept from the start of the process execution at specified intervals. Furthermore, if the level is "2", then the target of the recording is a memory image dump list.

Next, the process carried out by the information generating apparatus 1 of Example 1 will be described.

Figure 8:
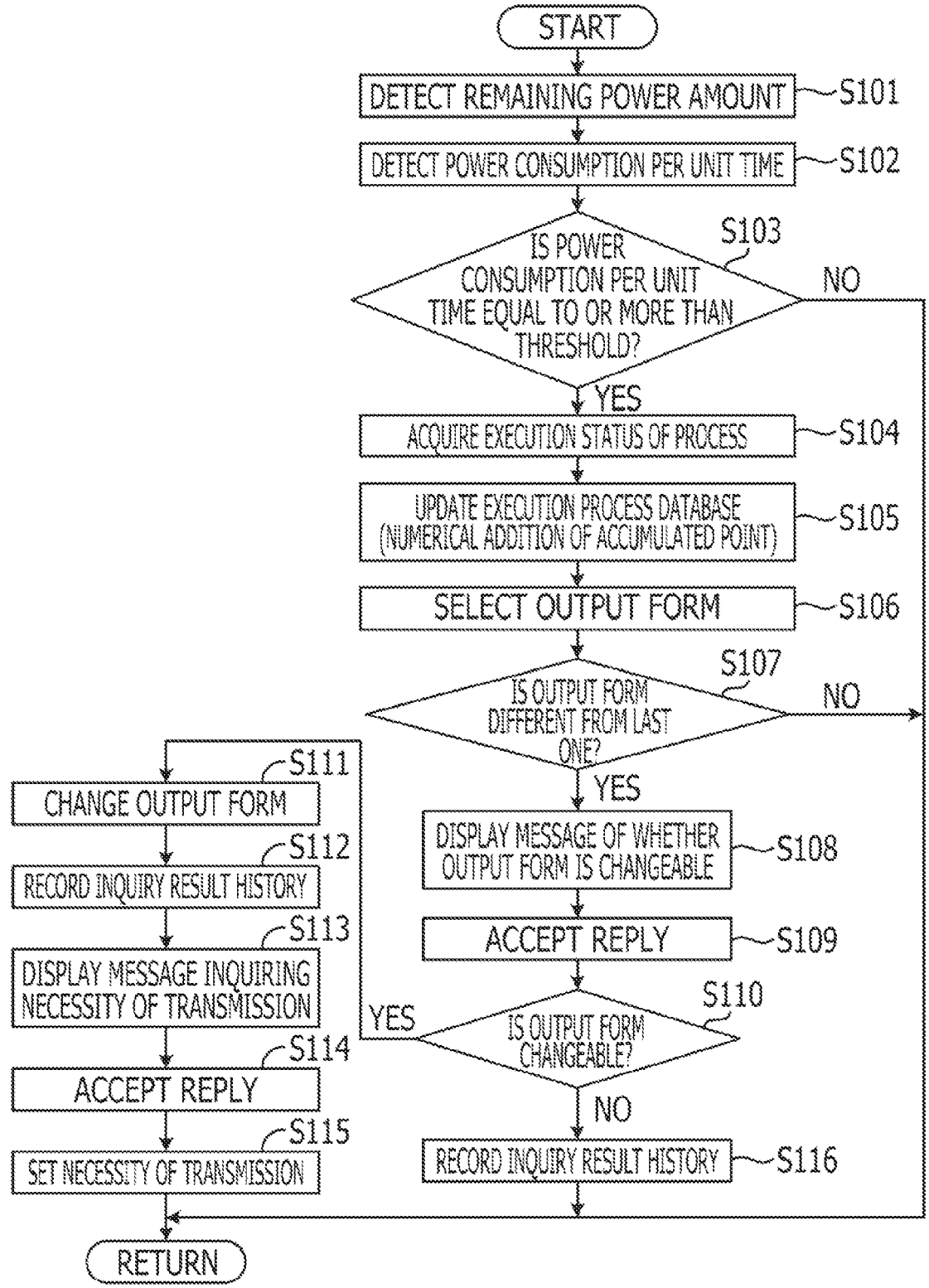
FIG. 8 is a flow chart illustrating an exemplary process for determining a log level of the information generating apparatus according to Embodiment 1.

FIG. 8 is a flow chart illustrating an exemplary process for determining a log level of the information generating apparatus 1 according to Embodiment 1. The log-level determining process of Example 1 is a process where the power consumption of the power unit 13 is detected and a log level is then determined based on the status of the power consumption.

The information generating apparatus 1 executes an information generating program PRG under the control of the control unit 10. As a result, a log-level determining process described below is repeatedly carried out at specified intervals of time, for example, 30 seconds, one minute, or three minutes.

The power detecting part 101 detects the remaining power amount of the battery housed in the power unit 13 (S101). In S101, for example, the voltage of the battery is used as a value alternative to the remaining power amount.

Here, the record unit 11 records the detected remaining power amount of the battery and then permits the subsequent processes to use the recorded amount. Furthermore, since the major cause of power consumption is an increase in process load of the control unit 10, the power detecting part 101 may detect the operating rate of the control unit 10 and uses it as a value alternative to the remaining power amount.

The power detecting part 101 detects the power consumption per unit time (S102). The unit time is an execution cycle of the log-level determination process and may be one minute or the like. Furthermore, the power consumption may be calculated from a variation in remaining power amount of the battery. In S102, the power detecting part 101 subtracts the detection value of the remaining power amount detected at the present from the detection value of the remaining power amount detected at the last time and the result of the subtraction is then determined as a power consumption amount per unit time. Furthermore, the power detecting part 101 divides the difference between the present remaining power amount and the last remaining power amount by the time passed from the last to the present to determine power consumption per unit time. The power detecting part 101 may represent a variation of the voltage as a variation vector V (ti) using time ti, which is a value representing the power consumption per unit time.

The consumption determining part 102 determines whether the power consumption per unit time detected in S102 is equal to or more than a specified threshold value (S103). For example, when the power consumption per unit time is expressed using the variation of the voltage, a specified threshold may be set to 0.6 mV/min or the like. Although the specified threshold has been described as a fixed value previously stored in the recording unit 11 in Example 1, it may be a variation dynamically changed according to the internal or external circumstances of the information generating apparatus 1 as described below in Example 2 or the like.

In S103, if the consumption determining part 102 determines that the power consumption is equal to or more than a specified value (YES in S103), then the status acquiring part 103 acquires the execution status of the process carried out by the process executing part 100 (S104). In S104 of Example 1, the status acquiring part 103 specifies the execution status of each of various executable processes, or the process carried out by the process executing part 100. The various executable processes include processes stored in the execution process database 111, such as those of application programs or the like for games, One seg (TV receiver application and display application), mail (e-mail application), and browser (browser application). Furthermore, the status acquiring part 10 may specify processes in execution including the execution of specific processes for basic functions of a mobile phone, such as a conversation function and a function of detecting a communication base terminal.

In S103, furthermore, if the consumption determining part 102 determines that the power consumption is less than the specified threshold (NO in S103), then the log-level determining process is ended. After reaching a specified number of cycles, the processes subsequent to S101 are repeated.

After carrying out the process in S104, to the execution process database 111, the numeral management part 105 updates the addition of a specified numerical value to the accumulated point corresponding to the process in execution, based on the execution status obtained by the status acquiring part 103 (S105). For example, if the status acquiring part 103 specifies an application program, "game1", as a process in execution, the numeral management part 105 considers that the process is a cause of an increase in power consumption and updates a record for the process in the execution process database 111. The numeral management part 105 updates, for example, the data for the item of detection time by the time determined as one which is equal to or more than the power consumption per unit time.

Here, the detection time may be replaced with another time, such as an update time. Furthermore, the numeral management part 105 updates the data for the item of power consumption using the power consumption per unit time. Furthermore, the numeral management part 105 updates the data for the item of point using the specified numerical value. Furthermore, the numeral management part 105 updates the data for the item of accumulated point by the addition of the specified numerical value to the numerical data recorded on the item of accumulated point. The specified numerical value added may be, for example, "1.0". Furthermore, if the process executing part 100 simultaneously carries out two or more processes, then the numeral "1.0" is divided by the number of the processes carried out by the process executing part 100 and the resulting numerical value is then given to each of the processes. Thus, the execution of two or more processes may be considered as a cause of an increase in power consumption. For example, if the process "game 1" and the process "One seg" are carried out, then each process is provided with "0.5", one-half of "1.0"

The history-information generating part 104 selects an output form from the accumulated points stored in the execution process database 111 with reference to the log level table 113 (S106). The history-information generating part 104 selects an output form based on the reference value when the maximum value of the accumulated point of each record stored in the execution process database 111 reaches to each of the reference values of two or more stages defined in the log level table 113. For example, if the log level table 113 employs numerical values exemplified in FIG. 7 and the accumulated value is "30.5", then the log level is "1" and the target of the recording is the execution status of the process, where the process in execution is also included. Then, an output form is selected based on the execution status. Furthermore, the history-information generating part 104 may be designed to determine a log level and an output form for each record, or each process, but not for the maximum value of the accumulated point of each record.

The history-information generating part 104 determines whether the selected output form differs from the result of the last decision (S107).

In S107, if the history-information generating part 104 determines that the output form is different from the last one (YES in S107), then the display unit 15 displays a desired message that asks the user whether the output form is changeable (S108).

Figure 9:
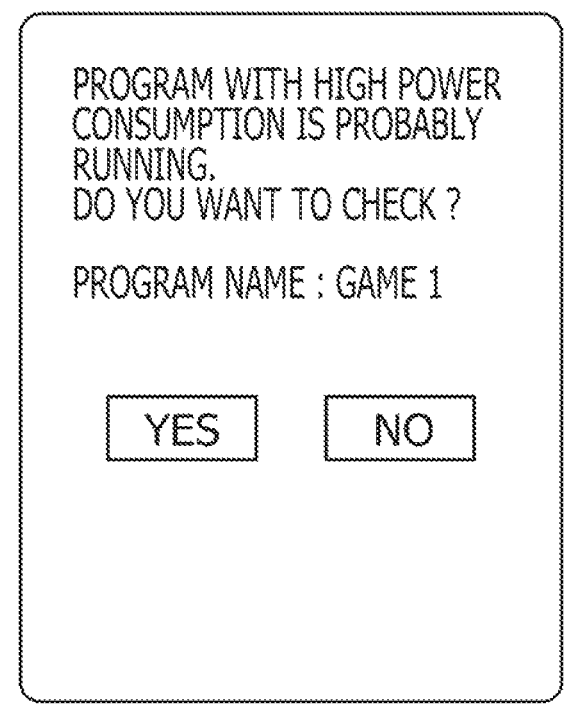
FIG. 9 illustrates an exemplary display screen of a display unit of the information generating apparatus according to Embodiment 1.

FIG. 9 illustrates an exemplary display screen of the display unit 15 of the information generating apparatus 1 according to Embodiment 1. FIG. 9 illustrates an exemplary screen to be displayed for an inquiry about the output in S108. The screen displays a message of "A program with high power consumption is probably running. Do you want to check?". In addition, it displays the name of the process in execution and selection buttons, "Yes" and "No". The user checks the message and then operates the operation input unit 14 to select "Yes" or "No".

Referring now to the flow chart, the operation input unit 14 receives the operation of selecting the reply to the inquiry (S109) and then determines whether the output form may be changed with reference to the content of the received operation (S110). For instance, if the operation input unit 14 accepts that the user has select "Yes" on the screen illustrated in FIG. 9 in S109, then it is determined that the output form may be changed in S110. In contrast, if the operation input unit 14 accepts that the user has selected "No" on the screen illustrated in FIG. 9 in S109, then it is determined that the output form may not be changed in S110.

In S110, if the operation input unit 14 determines that the output form may be changed (Yes in S110), then the history-information generating part 104 changes the output form to one selected in S106 (S111). Subsequently, the history-information generating part 104 allows the level-change log database 112 to store the history of the inquiry result (S112). In S112, the history-information generating part 104 stores the data of inquiry time, result, target process, and log level as a history of changes to the level change log database 112. In this case, the record content has changed the output form. Thus, the inquiry result is "Yes" and the log level is changed to one for the output form.

Furthermore, the display unit 15 displays a desired message to the user, where the message inquires whether the transmission of history information to the external recording apparatus 2 is desired and/or required (S113). Here, the external recording apparatus 2 may be, for example, a server computer managed by a business entity or the related business entity thereof, such as the manufacturer, distributor, or the like of the information processing apparatus 1.

Figure 10:
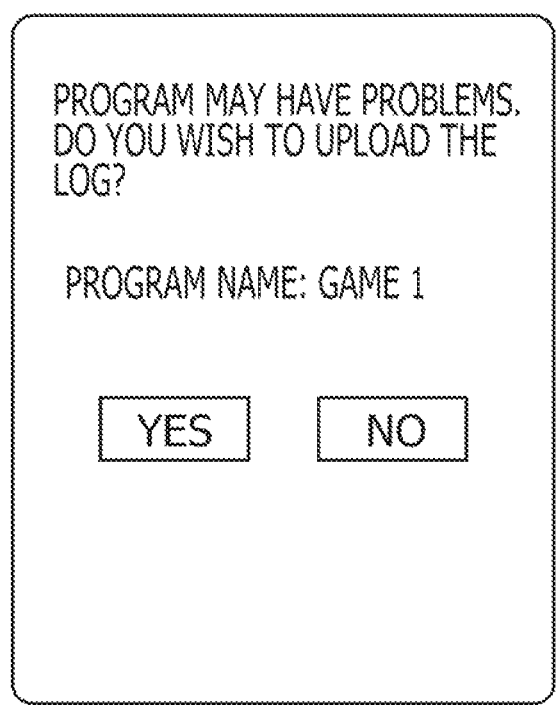
FIG. 10 illustrates an exemplary display screen of the display unit of the information generating apparatus according to Embodiment 1.

FIG. 10 illustrates an exemplary display screen of the display unit 15 of the information generating apparatus 1 according to Embodiment 1. FIG. 10 is an exemplary screen displayed as an inquiry of transmission desirability and/or necessity in S113. The screen displays a message of "Program may have problems. Do you wish to upload the log?" as well as the name of the process in execution and an image that represents the selection buttons, "Yes" and "No". The user may confirm the message and operate the operation input unit 14 to select "Yes" or "No".

Referring again to the flow chart, the operation input unit 14 accepts the operation of selecting the replay to an inquiry (S114) and then sets up the transmission desirability and/or necessity of history information based on the accepted operation content (S115). For example, if the operation input unit 14 accepts that the user has selected "Yes" on the screen illustrated in FIG. 10, then S115 sets to "need for transmission". For example, if the operation input unit 14 accepts that the user has selected "No" on the screen illustrated in FIG. 10, then S115 sets to "no need for transmission". After reaching a specified number of cycles, the processes subsequent to S101 are repeated.

If the operation input unit 14 determines that the output form is unchangeable in S110 (NO in S110), then the history-information generating part 104 stores the history of an inquiry result in the level-change log database 112 without changing the output form of S111 (S116). Since the record content in this case has not changed the output form, the inquiry result is "no" and the log level is one for the original output form. Then, the history-information generating part 104 ends the log-level determining process. After reaching a specified number of cycles, the processes subsequent to S101 are repeated.

In S107, if the history-information generating part 104 determines that the output form has not been changed (NO in S107), the history-information generating part 104 ends the log-level determining process. After reaching a specified number of cycles, the processes subsequent to S101 are repeated.

If the operation input unit 14 accepts a reply that the output form is not changed, then the display unit 15 may not inquire a change in output form until it satisfies specified conditions. Therefore, the display unit 15 may increase user's convenience by not inquiring a change in output form until it satisfies specified conditions. The specified conditions include, for example, those of a case where a specified time interval has passed, a case where the accumulated point has further increased, a case where an accumulated point has again reached a reference value for changing the output form after subtraction of the accumulated point.

Furthermore, if the display unit 15 has already inquired transmission desirability and/or necessity, it may not inquire transmission desirability and/or necessity as long as the specified conditions are satisfied. The user's convenience may be increased by omitting an inquiry which is performed every time the log-level determining process even though such a process is repeated in a specified cycle. The specified conditions include, for example, a further increase in accumulated point and a further increase in power consumption per unit time after changing the log level. Furthermore, the display unit 15 may execute an inquiry for transmission desirability and/or necessity only at the time of recording history information with a log level of "3". The display unit 15 inquires the necessity of transmission to the external recording apparatus 2 only when serious abnormalities may be generated. There, it leads to a decrease in process load and enhances an efficient use of the recording area of the external recording apparatus 2.

Alternatively, the display unit 15 may be designed so that it does not inquire of the user, while the history-information generating part 104 may be designed to automatically change the output form. In this case, a change time is recorded in the item of inquiry and the item of result is blank. Thus, the log-level determining process of Example 1 is performed.

Figure 11:
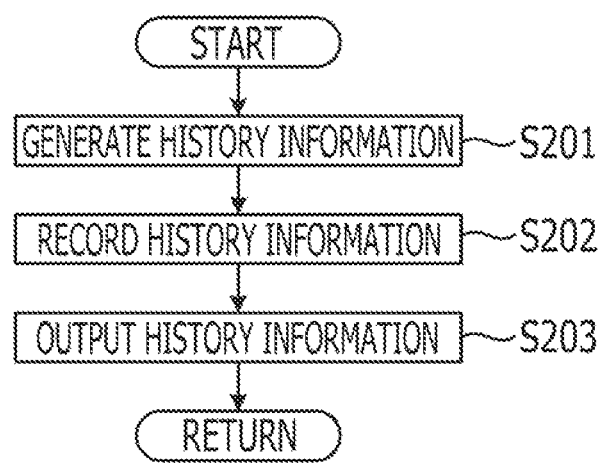
FIG. 11 illustrates an exemplary process for generating history information of the information generating apparatus according to Embodiment 1.

FIG. 11 illustrates an exemplary process for generating history information of the information generating apparatus 1 according to Embodiment 1. The history-information generating process of Example 1 is a process that generates and outputs history information according to the log level determined by the log-level determining process.

The information generating apparatus 1 executes the information generating program PRG under the control of the control unit 10 to carry out the history-information generating process according to the determined log level. If the log level is "0", then the history-information generating process is carried out in response to the "execution start" or "execution end" of a history-recording target process. If the log level is "1", then the history-information generating process is carried out at specified time intervals to determine whether the execution of the target process is still executed in addition to consider the "execution start" or "execution end" of the target process. If the log level is "2", the log-level determining process executes the history information generating process in response to the determination of the output form. Therefore, a memory image at the time of an increase in power consumption may be recorded as a dump list.

The history-information generating unit 104 generates the history information about the history of process execution based on the execution status acquired by the status acquiring part 103 (S201). For example, the log level "0" or "1" generates history information including times or the like of events, such as the execution start and execution end of the process, as those in execution status history. In addition, for example, the log level "2" generates history information, such as a dump list representing the data expanded on the register. Here, the processes are individually provided with their respective log levels, so that the history-information generating part 104 may generate history information with different log levels for the respective processes. However, if there is a process with a log level of "2", the history-information generating part 104 may also cause a situation where a memory image exclusive to such a process may not be obtained.

In such a case, the history-information generating part 104 may generate history information about a dump list or the like as a history of all processes executed during the generation of history information.

The history-information generating part 104 stores or internally outputs the history information generated in S201 in the log database 110 (S202). The communication unit 12 transmits history information from the log database 110 to the external recording apparatus 2 (S203). Alternatively, the communication unit 12 may transmit history information stored in the log database 110 as long as the transmission necessity of history information is set to "need for transmission". Furthermore, the display unit 15 may display history information. An external output, such as transmission or display may be of not only information stored in the log database 110 but also information stored in another log database, such as a level-change log database 112. Therefore, a more detailed analysis may be attained by additional output of information stored in another log database, such as the level-change log database 112. Furthermore, the user may take out the information from the recording unit 11 where the history information and so on are stored and then analysis such information.

In this way, the history-information generating process of Example 1 is performed. According to Embodiment 1, as described above, history information based on the execution status of each of various processes may be generated when the power consumption per unit time is equal to or more than a specified threshold. The generated history information represents the execution status of a process, such as one of an application program, executed during an increase in power consumption. In particular, information about a dump list or the like is displayed when the power consumption is continuously increasing to raise a log level. Therefore, the history information allows analysis of a cause of an increase in power consumption. In particular, if the state of power consumption is serious, a detailed analysis may be performed by reference to the memory image of the control unit 10 or the recording unit 11 when executing the process. Furthermore, the history-information generating part 104 does not generate or store the detailed history information about all the processes but generates the history information with a different level for every process to effectively use the recording area of the recording unit 11. Furthermore, for example, when the user experiences an irregularity that may be due to an increased rate of power consumption, the user can provide information to a business entity, such as a manufacturer or selling agency, or the related business agency thereof to obtain a reason for the irregularity or a solution to address the irregularity. In this case, based on the history information with a different level for every process, it is possible to analyze a cause and possibly focus a process that may have a higher likelihood of causing an abnormality. Therefore, the number of processes required for fixing the abnormality may be decreased.

Embodiment 2 is an embodiment that determines the desirability and/or necessity of a process, such as one for determining a log level, depending on a particular state of whether an information generating apparatus is moving at high speed, or the like in Embodiment 1.

In Embodiment 2, the same structural elements as those in Embodiment 1 are designated by the same reference numerals to refer to Embodiment 1 and their detail description will be omitted. In Embodiment 2, a process for establishing a wireless connection to a communication base station, a conversation process, and a communication process are accepted as specific processes. In Embodiment 2, furthermore, a state where any of a high speed movement, a conversation, and a communication is not carried out is accepted as a reference state. That is, a process for establishing a wireless connection to a communication base station, a conversation process, and a communication process is regarded as fundamental processing of information generating apparatus are accepted as basic processes of an information generating apparatus 1 (in this case, a mobile phone) and distinguished from a process that carries out an application program. These basic processes may be executed by a generally made circuit and may not be considered of a log-recording target according to an embodiment. In addition, a state where any of these processes is not executed is accepted as a reference state. During the period of carrying out a specific process, an increase in power consumption occurs in comparison with the reference state. In Embodiment 2, therefore, the specific process allows any of other various processes to be carried out in consideration of a state of increasing the power consumption. Hereinafter, a difference between the reference state and the state where the specific process is carried out will be described.

Figure 12A:
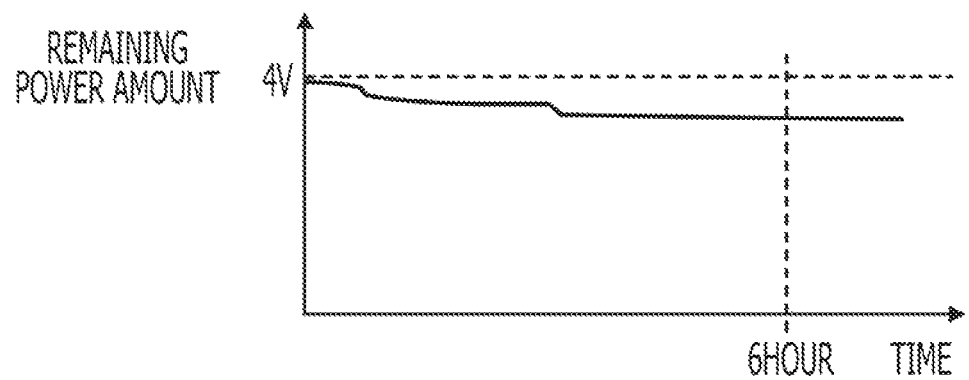
FIGS. 12A and 12B are graphic diagrams illustrating exemplary time-dependent changes in remaining power amount of an information generating apparatus according to Embodiment 2.
Figure 12B:
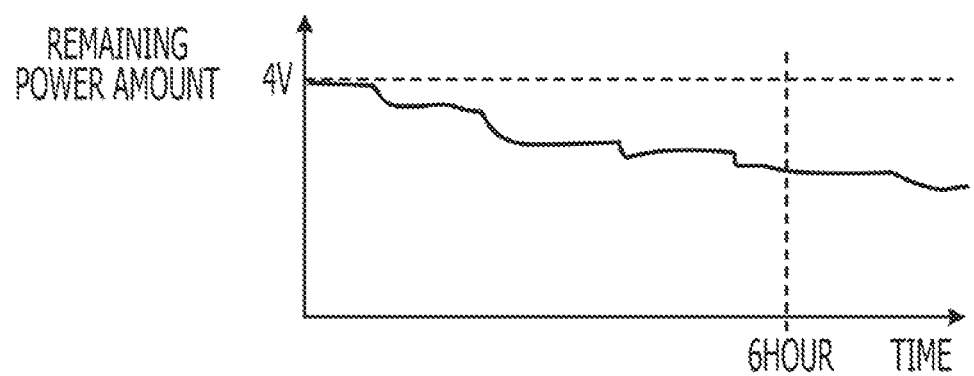

FIG. 12A and FIG. 12B are graphic diagrams illustrating exemplary time-dependent changes in remaining power amount of the information generating apparatus 1 according to Embodiment 2. In FIG. 12A and FIG. 12B, the horizontal axis represents the passage of time and the vertical axis represents the remaining power amount of a battery to show a variation in remaining power amount with time. FIG. 12A illustrates a variation in remaining power amount with time in a standby state, or a reference state while any process of an application program or the like is not executed.

FIG. 12B illustrates a variation in remaining power amount with time in high speed movement. As illustrated in FIG. 12B, the power consumption increases during high speed movement in comparison with the reference state illustrated in FIG. 12A. During the high speed movement, the power consumption increases because of repetition of briefly scanning communication base stations to be wirelessly connected and establishing the connection.

Figure 13A:
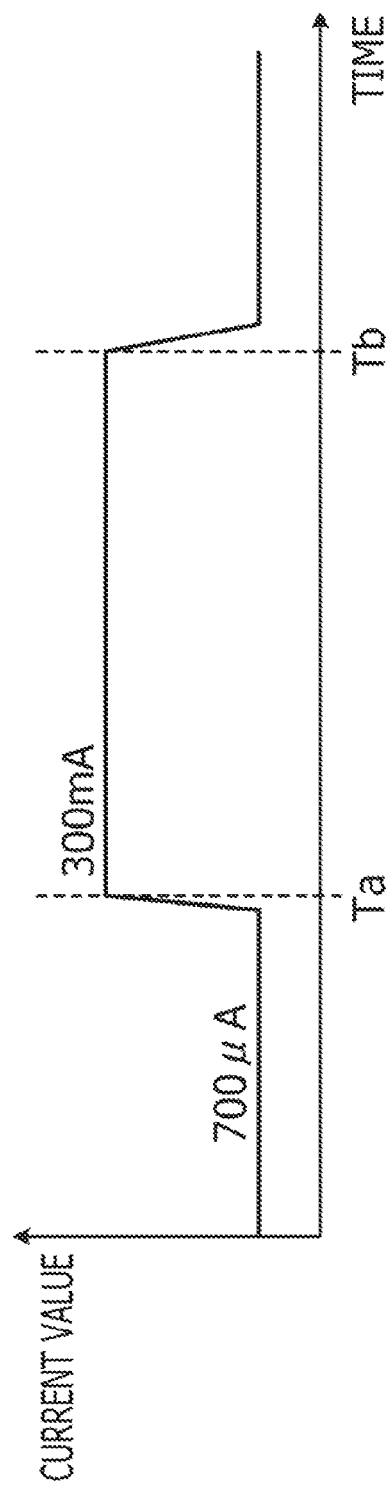
FIGS. 13A and 13B are graphic diagrams illustrating exemplary time-dependent changes in power consumption of an information generating apparatus according to Embodiment 2.
Figure 13B:
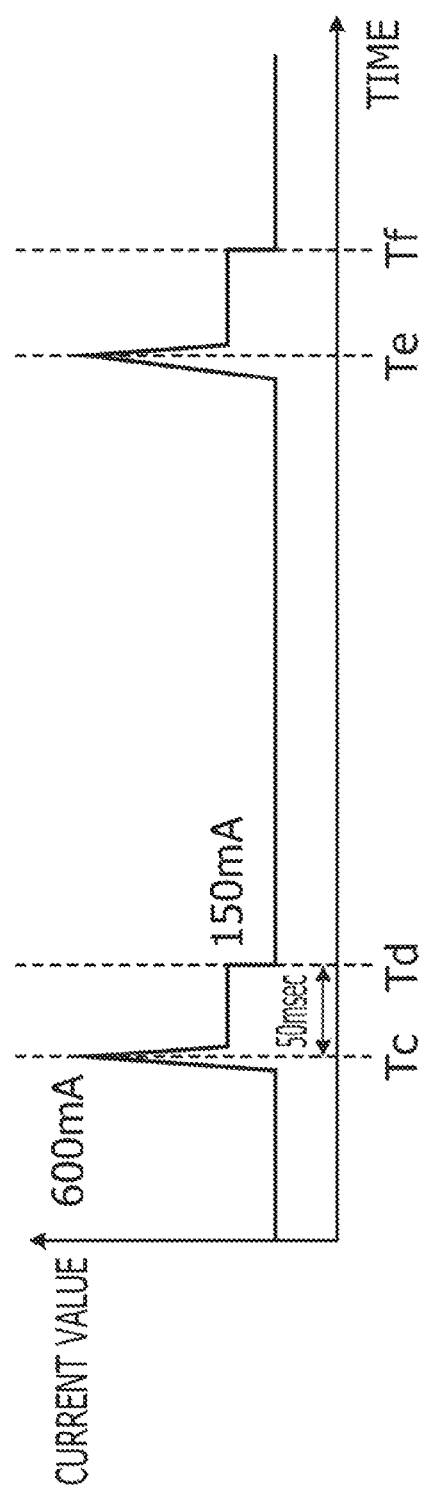

FIGS. 13A and 13B are graphic diagrams illustrating exemplary time-dependent changes in power consumption of an information generating apparatus according to Embodiment 2. In FIG. 13A and FIG. 13B, the horizontal axis represents the passage of time and the vertical axis represents the current value of a battery to show a variation of current with respect to time.

Each of FIG. 13A and FIG. 13B is an exemplary graphical representation of the measured current value that serves as an alternative value equivalent to power consumption per unit time. FIG. 13A illustrates an example of a variation in current with time when the information generating apparatus performs a conversation process. In FIG. 13A, the conversation process is carried out during the period of Ta to Tb. As illustrated in FIG. 13A, the current value in the reference state before the conversation is 700 μA, but the current value while a conversation is in progress increases up to 300 mA. FIG. 13B illustrates an example of a variation in current with time when the scanning of a communication base station which may establish wireless communication with the information generating apparatus. FIG. 13B illustrates that the scanning is carried out to establish the connection during the periods of Tc to Td and Tc to Tf. In FIG. 13B, there is illustrated an exemplary condition where the current value is 700 μA in the reference state, it increases up to 600 mA when the scanning is started, it decreases when the connection is established, and the communication is carried out during that the current value is in the range of 150 mA to 5 msec, which is higher than the reference state.

The configuration of the information generating apparatus 1 and the process carried out by such an apparatus according to Embodiment 2 will be described. The hardware configuration of the information generating apparatus 1 of Embodiment 2 is the same as that of Example 1, so that the description of the hardware configuration will be omitted while referring to Embodiment 1.

Next, the functional configuration of the information generating apparatus 1 of Example 2 will be described.

Figure 14:
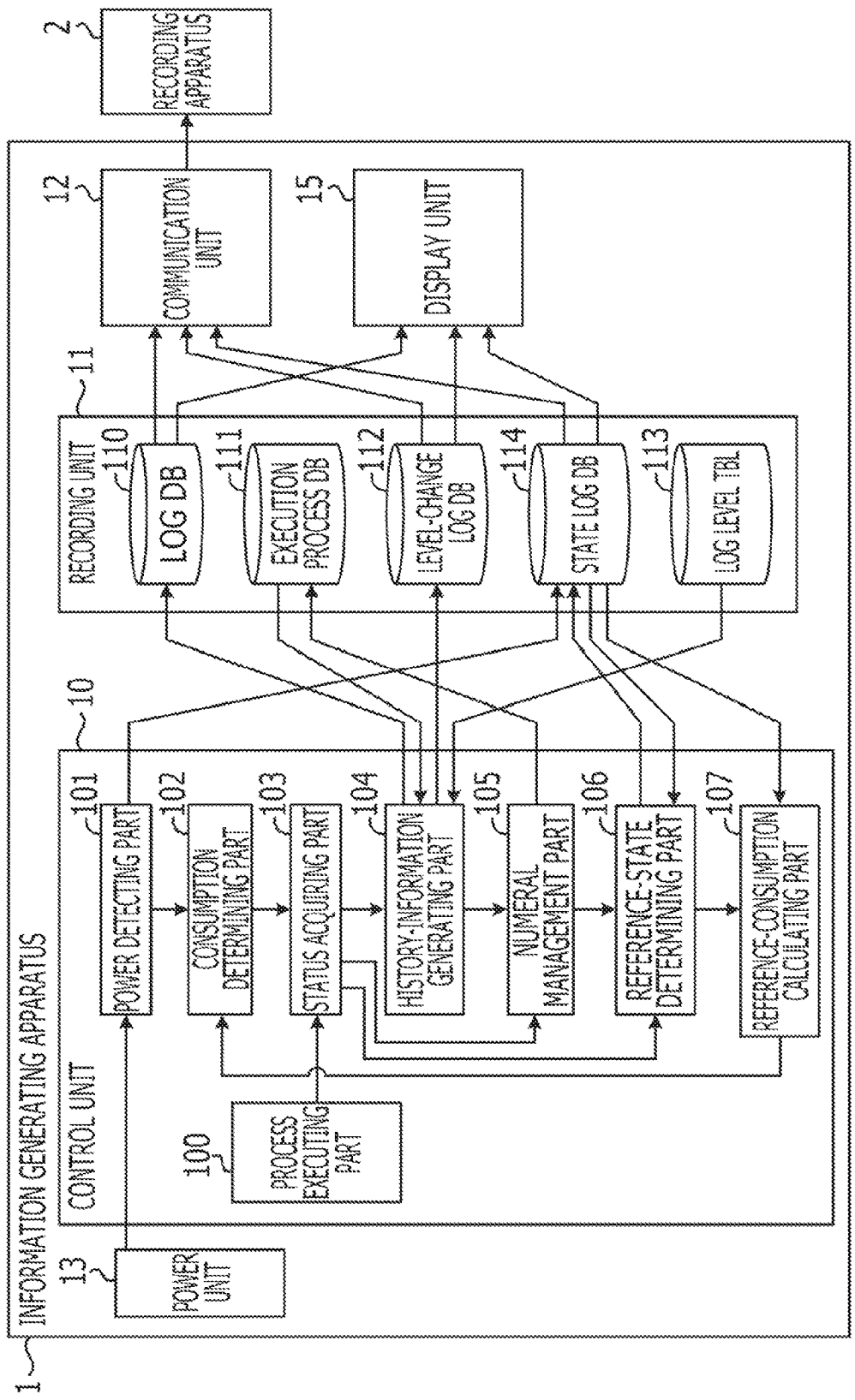
FIG. 14 illustrates an exemplary functional configuration of the information generating apparatus according to Embodiment 2.

FIG. 14 illustrates an exemplary functional configuration of the information generating apparatus 1 according to Embodiment 2. The information generating apparatus 1 executes an information generating program PRG under the control of the control unit 10. As a result, it realizes the functions of a process executing part 100, a power detecting part 101, a consumption determining part 102, a status acquiring part 103, a history-information generating part 104, a numeral management part 105, a reference-state determining part 106, and a reference-consumption calculating part 107. Alternatively, instead of executing the information generating program PRG, the control unit 10 may include a circuit that realizes the functions of a process executing part 100, a power detecting part 101, a consumption determining part 102, a status acquiring part 103, a history-information generating part 104, a numeral management part 105, a reference-state determining part 106, and a reference-consumption calculating part 107.

For example, the reference-state determining part 106 is a function that determines whether its own apparatus is in a previously determined reference state based on the execution status of a specific process. In other words, it is a function realized by executing a program module or a circuit in the control unit 10.

For example, the reference-consumption calculating part 107 is a function that calculates the central value of power consumption per unit time as reference consumption during a period in which it is determined as a reference state.

In other words, it is a function realized by executing a program module or a circuit in the control unit 10. The reference-consumption calculating part 107 calculates the central value of the power consumption in a reference state.

In Embodiment 2, it is determined whether the consumption per unit time with respect to the standard consumption is equal to or more than a specified threshold. In other words, the sum of the standard consumption and the threshold of Embodiment 2 correspond to the threshold of Embodiment 1, so that the threshold may be dynamically changed in comparison with Embodiment 1. In the following description, an example in which the total average of power consumption per unit time serves as a central value will be described. However, the central value is not limited to the total average value. Alternatively, the central value may be another kind of an average value, such as a geometric average or a harmonic average. Alternatively, furthermore, the central value may be a median value, a mode value, or the like.

Furthermore, the information generating apparatus 1 executes an information generating program PRG under the control of the control unit 10. Thus, part of the recording area of the recording unit 11 operated as information recording areas for a log database (log DB) 110, an execution process database (execution process DB) 111, a level-change log database (level-change log DB) 112, a log level table (log level TBL) 113, a state log database (state log DB) 114, and so on.

The state log database 114 is a database that stores the histories of state and remaining power amount associated with time. The term "state" refers to the result of determining the reference state determined by the reference-state determining part 106. Furthermore, the record content of the state log database 114 may be an object to be externally output, such as one transmitted to the recording apparatus 2, for example.

FIG. 15 illustrates an exemplary record content of a state log database 114 of the information generating apparatus according to Embodiment 2. For example, the state log database 114 stores data, such as histories of state and remaining power amount associated with time.

In a reference state, "0" is recorded on the item of "state" and serves as data representing a reference state. If not in a reference state, "1" is recorded on the item of "state" and serves as data representing a state other than a reference state. The remaining power amount of a battery housed in the power unit 13 is recorded on the item of "remaining power amount".

Here, a value of voltage or power consumption may be used as an alternative value equivalent to the remaining power amount. FIG. 15 shows an example using a voltage value.

Next, the process to be carried out by the information generating apparatus 1 of Embodiment 2 will be described.

Figure 16:
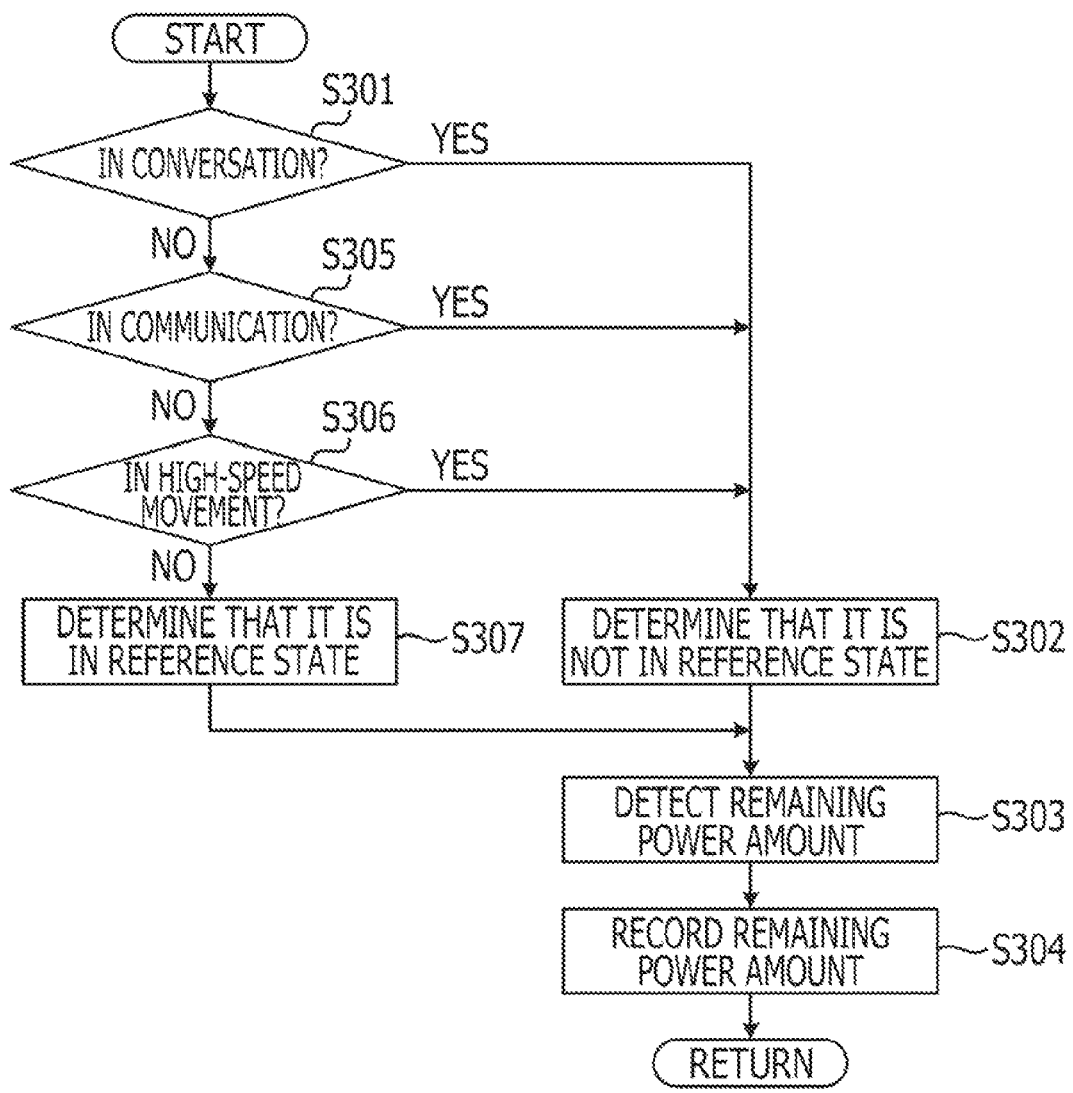
FIG. 16 is a flow chart illustrating an exemplary process for determining a state of the information generating apparatus according to Embodiment 2.

FIG. 16 is a flow chart illustrating an exemplary process for determining a state of the information generating apparatus 1 according to Embodiment 2. The state-determining process of Example 2 is a process to be executed as preprocessing of the log-level determining process. Thus, after carrying out the state-determining process with a specified cycle, the log-level determining process is carried out. The state-determining process is a process that determines whether the present apparatus is currently in a reference state.

The information generating apparatus 1 executes an information generating program PRG under the control of the control unit 10. With a specified cycle which is previously defined, the following state-determining process is repeatedly carried out. In the state-determining process, the reference-state determining part 106 determines whether the information generating apparatus 1 is in a reference state, in high speed movement, in conversation, or in communication. Furthermore, the execution state of the process is determined in a manner similar to that of the aforementioned state acquiring unit 103, and thus the detailed description thereof will be omitted.

The reference-state determining part 106 determines whether the apparatus is in conversation (S301). The term "in conversation" in S301 refers to a state where a telephone communication, such as a voice call or a video call (TV phone) is being performed.

In S301, if the reference-state determining part 106 determines that the apparatus is in conversation (YES in S301), then the process proceeds to S302. In S301, if the reference-state determining part 106 determines that the apparatus is not in conversation (NO in S301), the reference-state determining part 106 determines whether the apparatus is in communication (S305). The term "in communication" in S305 refers to the state where data communication, such as Internet communication, through the communication unit 12 is performed.

In S305, if the apparatus is determined to be in communication (YES in S305), the process proceeds to S302. In S305, if the reference-state determining part 106 determines that the apparatus is not in communication (NO in S305), the reference-state determining part 106 determines whether the apparatus is in high-speed movement. (S306). The determination of whether the apparatus is in high-speed movement is carried out by determining whether the number of communication base stations to which the communication unit 12 has connected within a latest specified time is equal to or more than a specified value. If the number of communication base stations to which the communication unit 12 has connected within a latest specified time is equal to or more than a specified value, then the reference-state determining part 106 determines that the apparatus is in high-speed movement.

In S306, if the reference-state determining part 106 determines that the apparatus is in high-speed movement (YES in S306), then the process proceeds to S302. In S305, if the reference-state determining part 106 determines that the apparatus is not in high-speed movement (NO in S306), the reference-state determining part 106 determines that the apparatus is in a reference state (S307). Since the apparatus is neither in high-speed movement nor in communication, the reference-state determining part 106 determines that the apparatus is in a reference state. Then, the process proceeds to S303.

In S302, the reference-state determining part 106 determines that the apparatus is not in a reference state. In S301, for example, if the reference-state determining part 106 determines that the apparatus is in conversation (YES in S301), then the reference-state determining part 106 determines that the apparatus is not in a reference state because of an increase in power consumption due to the communication.

In S305, for example, if the reference-state determining part 106 determines that the apparatus is in communication, then the reference-state determining part 106 determines that the apparatus is not in a reference state because of an increase in power consumption due to the communication.

In S306, for example, if the reference-state determining part 106 determines that the apparatus is in conversation (YES in S301), then the reference-state determining part 106 determines that it is not in a reference state because of an increase in power consumption due to a connection process associated with the high-speed movement.

In S303, the power detecting part 101 detects the remaining power amount of the battery housed in the power unit 10 (S303).

Then, the history-information generating part 104 records both the determined state and the detected remaining power amount as histories on the state log database 114 associated with time (S304) and then ends the determination process. After reaching to a specified number of cycles, the processes subsequent to S301 are repeated. Thus, the state determining process of Example 2 is performed.

Figure 17:
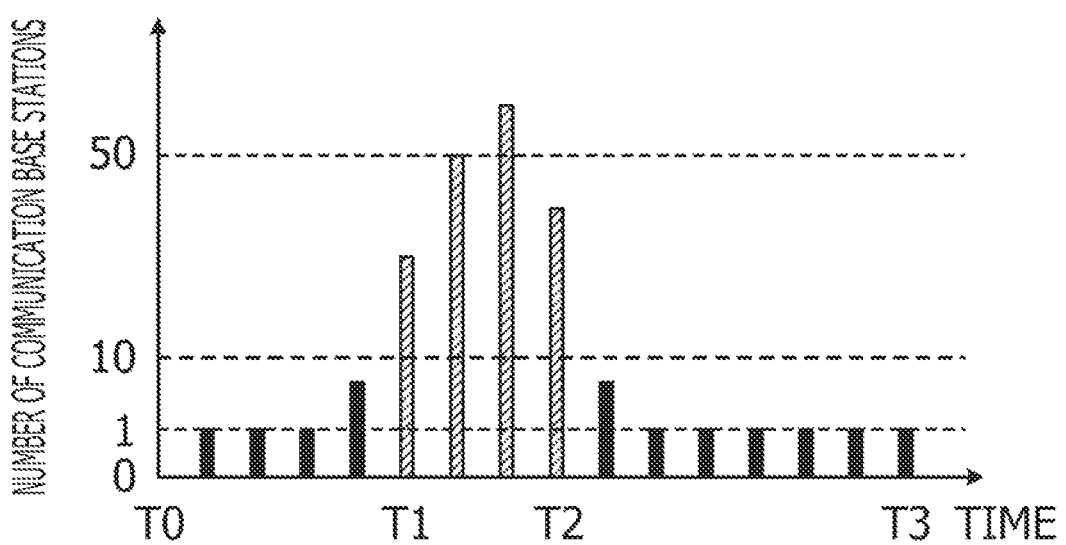
FIG. 17 is a graphic diagram illustrating a time-dependent change in number of communication base stations connected to the information generating apparatus according to Embodiment 2.

FIG. 17 is a graphic diagram illustrating a time-dependent change in number of communication base stations connected to the information generating apparatus 1 according to Embodiment 2. FIG. 17 illustrates a time-dependent change of the number of communication base stations, where the horizontal axis represents time and the vertical axis represents the number of communication base stations connected to the information generating apparatus 1 within a specified period of time. In the case of an example illustrated in FIG. 17, the specified value is set to "10". Thus, the number of communication base stations connected to the information generating apparatus 1 is 10 or more within the period of T1 to T2. Therefore, the reference-state determining part 106 determines that the information generating apparatus 1 is moving at high speed within the period of T1 to T2. In contrast, within each of the periods T0 to T1 and T2 and T3, the number of communication base stations connected to the information generating apparatus 1 is less than 10, so that the reference-state determining part 106 determines that the information generating apparatus 1 is not moving at high speed.

FIG. 18 is a flow chart illustrating an exemplary process for determining a log level of the information generating apparatus 1 according to Embodiment 2. The information generating apparatus 1 executes an information generating program PRG under the control of the control unit 10. After the execution of the state-determining process, a log-level determining process will be executed as follows.

The reference-state determining part 106 determines whether the apparatus is in a reference state with reference to the state-log database 114 (S401). The reference-state determining part 106 refers to the newest record currently stored in the state-log database 114 to determine whether the apparatus is in a reference state. If the apparatus is in a reference state, "0" is recorded on the item of "state" and serves as data representing that the apparatus is in a reference state, the reference-state determining part 106 determines that the apparatus is in a reference state.

In other words, in S401, the log-level determining process is completed if the reference-state determining part 106 determines that the apparatus is not in a reference state (NO in S401). Subsequently, after reaching the specified cycle, the state-determining process is performed and the processes subsequent to S401 are repeated. This is based on a fact that there is no need of changing the log level because of a large influence of a specific process in execution, even if the consumption of electric power has increased, when the information generating apparatus 1 is not in a reference state.

In S401, if the reference-state determining part 106 determines that the apparatus is in a reference state (YES in S401), then reference-consumption calculating part 107 detects the power consumption per unit time with reference to the state log database 114 (S402). The process in S402 corresponds to the process in S102 which is the log-level determining process of Embodiment 1 as described with reference to FIG. 8. In Embodiment 1, the power detecting part 101 detects the remaining power amount. In contrast, in Embodiment 2, the remaining power amount detected by the power detecting part 101 is stored in the state log database 114. Thus, the reference-consumption calculating part 107 may detect the power consumption per unit time with reference to this state log database 114.

The reference-consumption calculating part 107 calculates the average value per unit time of power consumption as a reference amount of consumption with reference to the state log database 114 (S403). In this case, the power consumption is detected by the reference-consumption calculating part 107 within a period during which the reference-state determining part 106 determines that the information generating apparatus is in a reference state in S401. The state log database 114 stores data of a fact whether it is in a reference state and the data of the remaining power amount associated with time. For example, in S403, the reference-consumption calculating part 107 calculates a variation in remaining power amount. In this case, the remaining power amount is detected by the reference-consumption calculating part 107 within a period during which the reference-state determining part 106 determines that the information generating apparatus is in a reference state in S401. The calculated variation corresponds to the power consumption in a reference state. Furthermore, the reference-consumption calculating part 107 calculates a reference consumption, which is an average value per unit time, by subtracting the calculated variation by the period during which the state is being determined as a reference state. Alternatively, the reference-consumption calculating part 107 may also represent the reference consumption using a reference consumption vector Vs.

The consumption determining part 102 determines whether the power consumption per unit time with respect to the reference consumption is equal to or more than a specified threshold (S404). Here, the term "reference consumption" refers to an average value per unit time calculated using the power consumption detected in S402 in the period where the reference-consumption calculating part 107 detects that the apparatus is in a reference state. In other words, the reference consumption of the apparatus may be represented by a value represented by the reference consumption vector Vs. The term "power consumption per unit time" refers to a value of power consumption per unit time detected in S402. In other words, power consumption per unit time is a value represented by a variation vector (Ti). In S404, the consumption determining part 102 determines whether "Vs−V(Ti)" is equal to or more than a specified value. In other words, the consumption determining part 102 determines whether the power consumption is larger than the reference state in a relative manner. A value used as a specified threshold used in Embodiment 2 where the determination is performed in a relative manner is different from one used in Embodiment 1 where the determination is performed in an absolute manner.

Figure 19A:
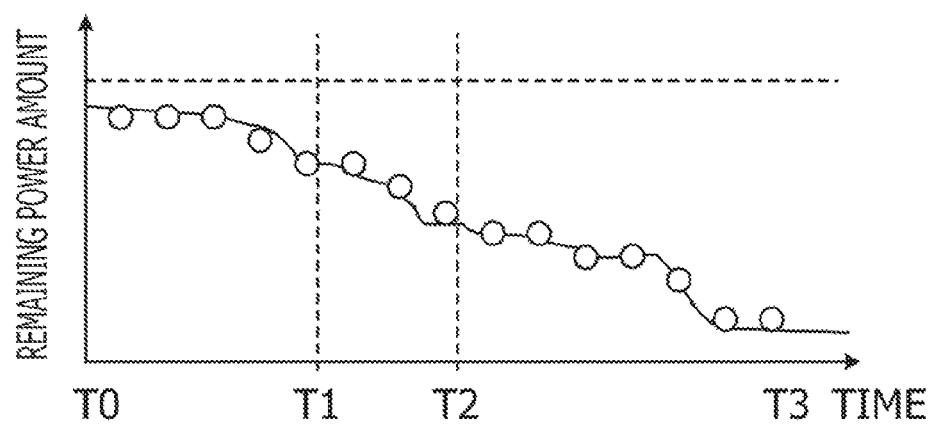
FIGS. 19A and 19B are graphic diagrams illustrating exemplary time-dependent changes in remaining power amount of the information generating apparatus according to Embodiment 2.
Figure 19B:
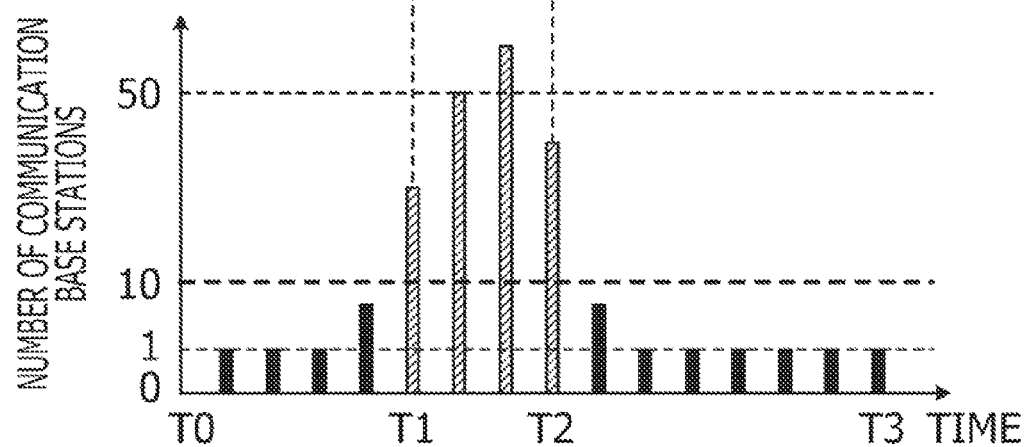

FIG. 19A and FIG. 19B are graphic diagrams illustrating exemplary time-dependent changes in remaining power amount of the information generating apparatus 1 according to Embodiment 2. FIG. 19 illustrates an example of a change in remaining power amount of the information generating apparatus 1 with time, where the horizontal axis represents the passage of time and the vertical axis represents the remaining power amount. Here, time T0 represents a time at which power distribution from the power supply of the information generating apparatus 1 is started. FIG. 19B illustrates an example of a change in number of communication base stations with time. Here, the time axes of FIG. 19A and FIG. 19B are synchronized with each other. The round mark in FIG. 19A is a time at which the power consumption per unit time is determined.

In FIG. 19, the variation vector V (Ti) at time Ti is defined by the following equation 1 where ΔT represents a unit time and ΔV represents a variation in remaining power amount per unit time at time Ti.

$$V(Ti) = \Delta V(Ti)/\Delta t \qquad \text{Equation 1}$$

In FIG. 19, during the periods of T0 to T1 and T2 to T3, the information generating apparatus 1 is in a reference state, so that the reference consumption vector Vs, which represents the reference consumption during each of these periods may be represented by the following equation 2:

$$Vs = \Sigma Vs(Ti)/n \qquad \text{Equation 2}$$

wherein Vs represents a reference consumption vector; Vs (Ti) represents power consumption per unit time at time Ti where the information generating apparatus 1 is in a reference state; and n represents the number of samples (number of detections of power consumption).

In the log-level determining process of Embodiment 1, ΔV (Ti) is compared with the threshold of Embodiment 1. In contrast, in the log-level determining process of Embodiment 2, "ΔV (Ti)−Vs" is compared with the threshold of Embodiment 2. In other words, the threshold S1 of Embodiment 1 and the threshold S2 of Embodiment 2 are in the relationship represented by the following equation 3:

$$S2 = S1 - Vs \qquad \text{Equation 3:}$$

In equation 3, Vs is a variable that varies with factors, such as the use environment of the information generating apparatus 1, the type of the battery, and the age of use. Thus, when the threshold S2 of Embodiment 2, which is a relative value, is represented by an absolute value like the threshold S1 of Embodiment 1, the threshold S2 is a variable as long as it is represented as an absolute value. Therefore, comparing with the log-level determination process in Embodiment 1, the log-level determination process in Embodiment 2 is hardly affected by a change in factor, such as the use environment, and the control unit 10 is able to perform a correct determination even in light of a change in a factor such as the use environment, for example.

Referring again to the flowchart of FIG. 18, if the consumption determining part 102 determines that the power consumption of the battery is equal to or more than the threshold (YES in S404), then processes subsequent to S104 of the log-level determining process of Embodiment 1 described with reference to FIG. 8 are executed.

In S404, if the consumption determining part 102 determines that the power consumption is less than the threshold (NO in S404), then the processes subsequent to the log-level determining process of Embodiment 1 described with reference to FIG. 8 are not executed. Therefore, the log-level determining process is ended. Subsequently, after reaching the specified cycle, the state-determining process is performed and the processes subsequent to S401 are repeated. Thus, the log-level determining process of Example 2 is performed.

The history-information generating process of Embodiment 2 is the same as that of Example 1, so that the description of the hardware configuration will be omitted while referring to Embodiment 1.

As described above, Embodiment 2 defines a process stably executed while increasing power consumption as a specific process. In Embodiment 2, therefore, the process for changing a log level based on the addition of a numeric value to the accumulated point is not performed during the execution of the specific process. If an increase in power consumption occurs due to the execution of the specific process, the log level is not raised. Thus, the log level may be suitably defined. Therefore, the log level may be suitably defined without an influence of a change in any of factors, such as the use environment of the information generating apparatus 1, the type of the battery, and the used numerical value.

In Example 2 as described above, the process for establishing wireless connection between the information generating apparatus 1 and the communication base station, the conversation process, and the communication process have been exemplified. However, it is not limited to such a configuration. Alternatively, the processes may further include a process for accepting the user's operation, a process for counting the number of steps using an acceleration sensor, and so on. Furthermore, if a foldaway mobile phone is used as the information generating apparatus 1 of the present embodiment, examples of the specific process may include a process for detecting the opened state of the mobile phone and lighting an illumination member on the operation input unit 14 and the display unit 15, or the like.

The configuration of an information generating apparatus of Embodiment 3 is the same as one disclosed in each of Embodiments 1 and 2, except that a numerical value to be added to the point according to the state of the information generating apparatus. In Embodiment 3, the same structural elements as those in Embodiment 1 or Embodiment 2 are designated by the same reference numerals to refer to Embodiment 1 or Embodiment 2 and their detail description will be omitted.

The hardware configuration of the information generating apparatus 1 of Embodiment 3 is the same as that of Example 1, so that the description of the hardware configuration will be omitted while referring to Embodiment 1.

Next, the functional configuration of the information generating apparatus 1 of Example 3 will be described.

Figure 20:
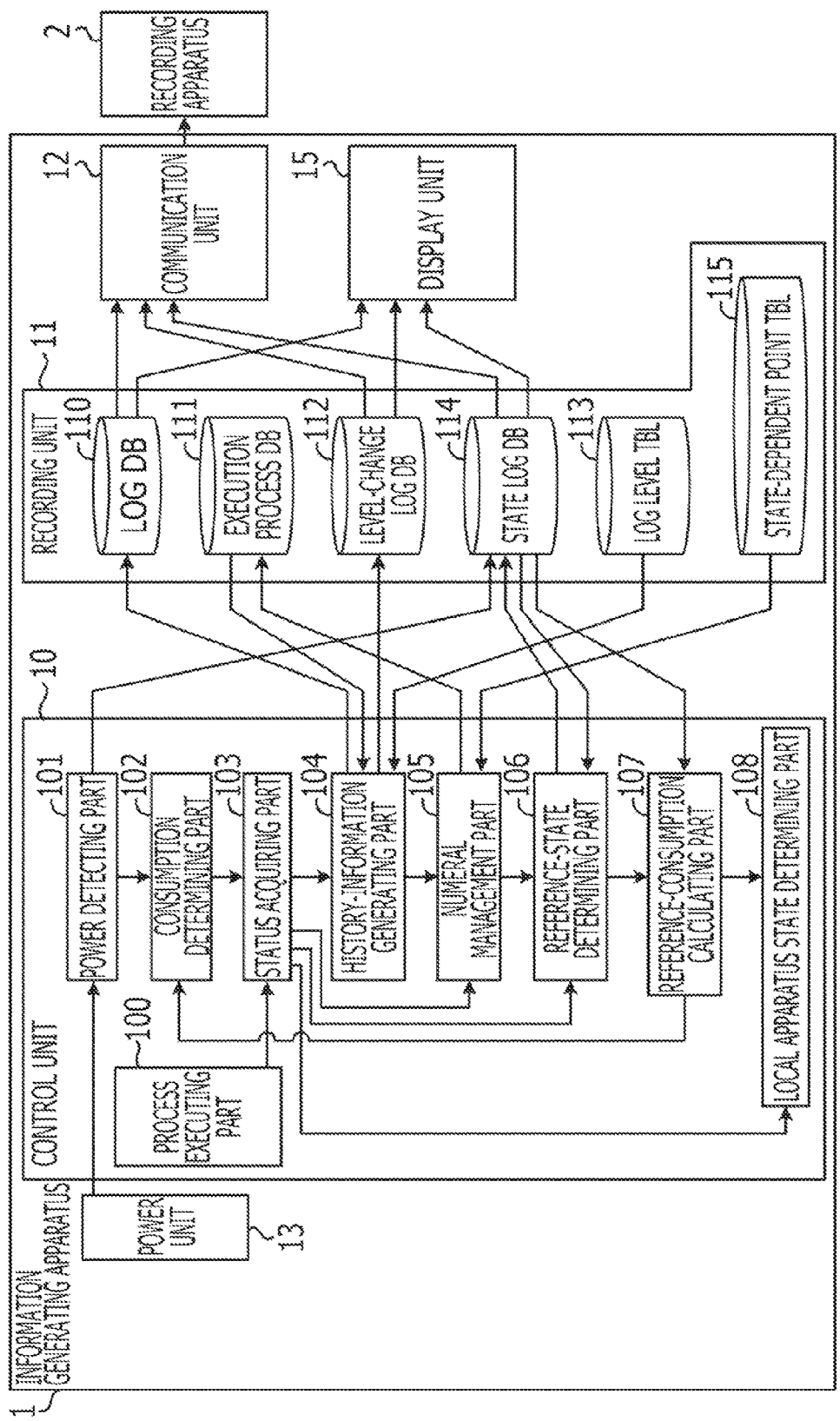
FIG. 20 illustrates an exemplary functional configuration of an information generating apparatus according to Embodiment 3.

FIG. 20 illustrates an exemplary functional configuration of the information generating apparatus according to Embodiment 3. The information generating apparatus 1 executes an information generating program PRG under the control of the control unit 10 to execute the functions of a process executing part 100, a power detecting part 101, a consumption determining part 102, a status acquiring part 103, a history-information generating part 104, a numeral management part 105, a reference state determining part 106, a reference consumption calculating part 107, and a local apparatus state determining part 108. Alternatively, instead of executing the information generating program PRG, the control unit 10 may include a circuit that realizes the functions of a process executing part 100, a power detecting part 101, a consumption determining part 102, a status acquiring part 103, a history-information generating part 104, a numeral management part 105, a reference-state determining part 106, a reference-consumption calculating part 107, and a local apparatus state determining part 108.

For example, the local apparatus state determining part 108 is a function that determines the state of the local apparatus based on the execution state of the specific process. In other words, local apparatus state determining part 108 may be a function realized by executing a program module or a circuit in the control unit 10.

In addition, the information generating apparatus 1 executes an information generating program PRG under the control of the control unit 10. Thus, part of the recording area of the recording unit 11 operates as information recording areas for a log database (log DB) 110, an execution process database (execution process DB) 111, a level-change log database (level-change log DB) 112, a log level table (log level TBL) 113, a state log database (state log DB) 114, a state-dependent point table (state-dependent point TBL) 115, and so on.

For example, the execution process database 111 of Embodiment 3 does not store any record about a process to be defined as a specific process for voice conversation, data communication, or the like but rather stores only a record of any process other than the specific processes, such as "game 1".

Furthermore, the items recoded in each record are the same as those of Embodiment 1.

For example, the state-specific point table 115 is a table on which numerical values to be provided as points are recorded associated with the apparatus state of the information generating apparatus 1. In Example 1, when the power consumption is equal to or more than the specified threshold, a fixed value is provided as a specified numerical value. In contrast, in Embodiment 3, different numerical values are provided depending on the state of the information generating apparatus 1. The numerical values currently recorded on the state-specific point table 115 are those to be provided depending on the state of the information generating apparatus 1.

FIG. 21 is a diagram that illustrates exemplary record contents of the state-different point table 115 for the information generating apparatus 1 of Embodiment 3. The state-different point table 115 is provided with items that represent the representative apparatus states of the information generating apparatus 1. That is, the states of the information generating apparatus 1, which represent "reference state", "in high-speed movement", "in conversation", "in communication", and so on, are previously recorded. Furthermore, the item of "point" that represents numerical values to be provided associated with the respective states of the apparatus are defined and the numerical values, "1.0", "0.5", "0.2", "0.1", and so on may be previously recorded.

Next, the process of the information generating apparatus will be described. The state-determining process of Embodiment 3 is the same as that of Example 2, so that the description of the hardware configuration will be omitted while referring to Embodiment 2.

FIG. 22 is a flow chart illustrating an exemplary process for determining a log level of the information generating apparatus 1 according to Embodiment 3. After carrying out the state-determining process, the information generating apparatus 1 executes an information generating program PRG under the control of the control unit 10. The log-level determining process illustrated below will be carried out. The reference-consumption calculating part 107 calculates the average value per unit time of power consumption as a reference amount of consumption with reference to the state log database 114 during the period where the state is determined as a reference state (S501). Furthermore, the consumption determining part 102 determines whether the power consumption per unit time with respect to the reference consumption is equal to or more than the threshold value (S502). The procedures of S501 to S502 correspond to the procedures of S403 to S404 of the log-level determining process of Embodiment 2 as described with reference to FIG. 18. In Embodiment 3, the process for determining whether the information generating apparatus 1 is in a reference state in S401 to S402 of the log-level determining process of Embodiment 2 does not need to be executed. In Embodiment 3, the history-information generating part 104 successively performs the process for determining a log level even without a reference state.

In S502, if the reference-consumption calculating part 107 determines that the power consumption is less than the specified threshold (NO in S502), then the log-level determining process is completed. Subsequently, if the state-determining process is executed after reaching the specified cycle, then the processes subsequent to S501 are repeated.

In S502, if it determines that the reference-consumption calculating part 107 is equal to or more than the threshold (YES in S502), the status acquiring part 103 acquires the execution status of the process executed by the process executing unit 100 (S503). The process of S503 corresponds to the process of S104 of the log-level determining process of Embodiment 1 as described with reference to FIG. 8.

The local apparatus state determining part 108 determines the state of the local apparatus based on a specific process execution status (S504). In Embodiment 3, just as in the case with Embodiment 2, a process for making wireless connection to a communication base station, a conversation process, and a communication process are accepted as specific processes. In S504, local apparatus state determining part 108 determines whether the information generating apparatus 1 is in a reference state, in high speed movement, in conversation, or in communication. Furthermore, the execution state of the specific process is determined in a manner similar to that of the aforementioned state acquiring unit 103, and thus the detailed description thereof will be omitted. The local apparatus state determining part 108 determines whether the information generating apparatus 1 is in a reference state, in high speed movement, in conversation, or in communication. Then, the result may be stored in the state-log database 114 in advance. Later, the state-log database 114 may be referenced to determine the state of the local apparatus.

The numeral management part 105 acquires a numerical value depending on the state of the local apparatus with reference to the state-different point table 115 (S505). For example, if the state-different point table 115 illustrated in FIG. 21 is used, the numerical value "1.0" is acquired as long as the apparatus is in a reference state. In addition, the numerical value "0.5" is acquired as long as the apparatus is in high-speed movement.

To the execution process database 111, the numeral management part 105 updates the addition of a specified numerical value to the accumulated point corresponding to the process in execution, based on the execution status and the numerical value obtained by the status acquiring part 103 (S506). Subsequently, the processes subsequent to S106 of the log-level determining process of Embodiment 1 as described with reference to FIG. 8 is carried out.

The process of S506 corresponds to S105 of the log-level determining process of Embodiment 1. In Embodiment 1, specified value is added. In contrast, in Embodiment 3, a numerical value acquired in S505 is added. For example, during the execution of "game 1" while the apparatus is moving at high speed, the numerical value "0.5" is acquired for the item of "point of record" and "0.5" is then added to the data of the item of "accumulated point". The numeral management part 105 determines that the execution of the process is a cause of an increase in power consumption. However, the cause of the increase is partially due to the high-speed movement. Thus, the numerical value to be added is set to be lower than the reference state. If a plurality of processes is executed by the process executing part 100 other than the specific process, each process is provided with a numerical value obtained by subtracting the acquired numerical value "0.5" by the number of processes being executed other than the specific process. For example, if the process "game 1" and the process "One seg" are carried out, then each process is provided with "0.25", one-half of "0.5".

Figure 23A:
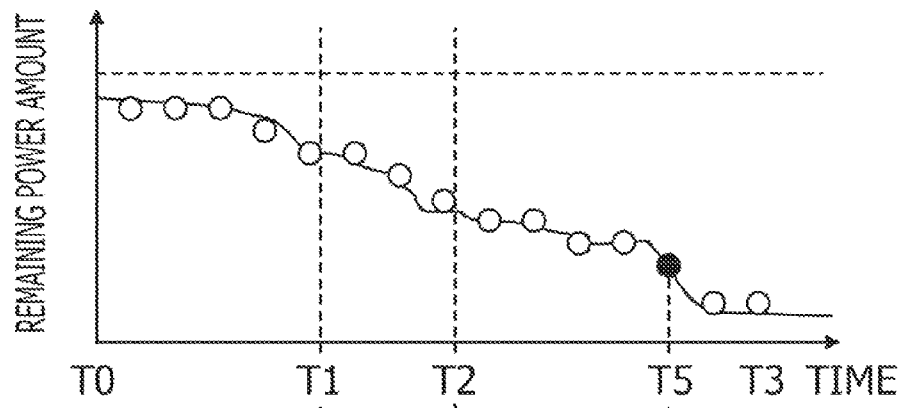
FIGS. 23A and 23B are graphic diagrams illustrating exemplary time-dependent changes in remaining power amount of an information generating apparatus according to Embodiment 3.
Figure 23B:
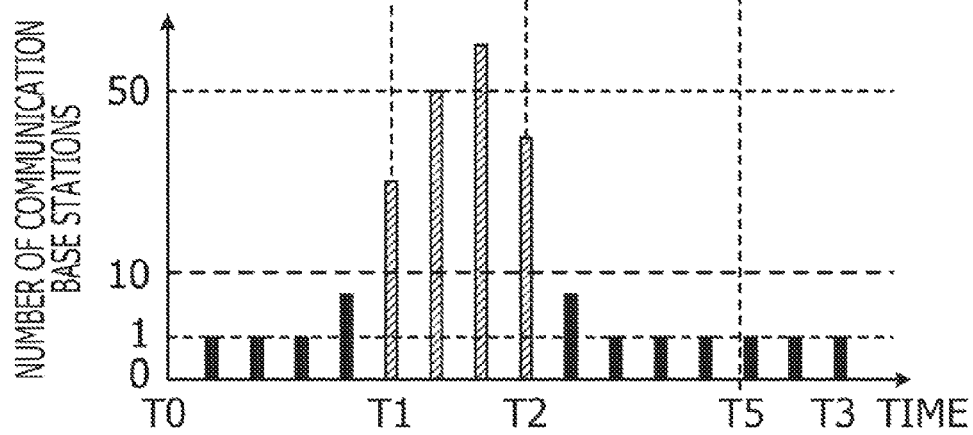
Figure 23C:
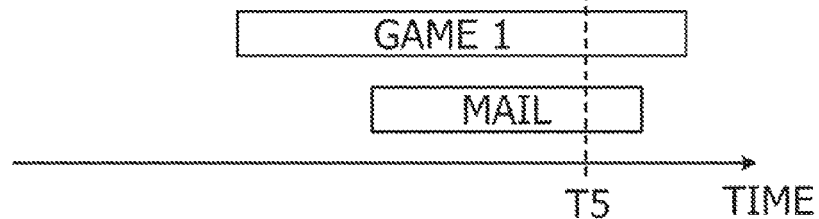
FIG. 23C illustrates an exemplary process which is executed during a time-dependent change in remaining power amount as illustrated in FIG. 23A or FIG. 23B in the information generating apparatus according to Embodiment 3.

Another example of the addition of a numerical value will be described. FIG. 23A and FIG. 23B are graphic diagrams illustrating exemplary time-dependent changes in remaining power amount of the information generating apparatus 1 according to Embodiment 3. FIG. 23A and FIG. 23B are graphic diagrams similar to those illustrated in FIG. 19A and FIG. 19B of Embodiment 2. FIG. 23C illustrates an exemplary process which is executed during a time-dependent change in remaining power amount as illustrated in FIG. 23A or FIG. 23B in the information generating apparatus according to Embodiment 3. Here, the time axes of FIG. 23A and FIG. 23B are synchronized with each other. An example in which the log-level determining process is carried out at the time of time T5 will be described. At time T5, values are set as follows: reference consumption Vs=0.02 mV, power consumption per unit time V (T5)=0.11 mV, and threshold C=0.05 mV. In this case, the consumption determining part 102 determines that the power consumption per unit time with respect to the reference consumption is equal to or more than the specified threshold as represented by the following equation 4:

$$V(T5)-Vs=0.11-0.02=0.09 \geqq 0.05=S \qquad \text{Equation 4}$$

At time T5, from FIG. 23B, the image generating apparatus 1 is not in a high-speed movement. In addition, from FIG. 23C, the processes executed are "game 1" and "mail", so that the image generating apparatus 1 is in a reference state because of none of the specific processes for basic functions are shown as being executed.

Therefore, the numerical value "1.0" is acquired from the state-specific point table 115 and "0.5" is then added to each of "game 1" and "mail" of the execution process database 111. Thus, the log-level determining process of Example 3 is performed.

The history-information generating process of Embodiment 3 is the same as that of Example 1, so that the description of the hardware configuration will be omitted while referring to Embodiment 1.

In Embodiment 3, the numeral management part 105 performs a change in numerical value to be added on the basis of the local apparatus in a reference state or a state where a specific process is executed. Therefore, even when the power consumption increases, the numeral management part 105 suppresses a change in numerical value to be added to the process in execution in comparison with the case where the specific process is not executed. Therefore, it becomes possible to reduce a risk of allowing the numeral management 105 to make an erroneous decision that another process executed during the execution of the specific process is a cause of an increase in power consumption. As a result, a correct analysis on abnormal power consumption may be facilitated.

Embodiment 4 is in the form of carrying out subtraction on the accumulated point given to the process depending on the situation in Embodiment 1. In Embodiment 4, the same structural elements as those in Embodiment 1 are designated by the same reference numerals to refer to Embodiment 1 and their detail description will be omitted.

The hardware configuration and functional configuration of the information generating apparatus 1 of Embodiment 4 is the same as that of Example 1, so that the description of the hardware configuration will be omitted while referring to Embodiment 1.

Next, the process carried out by the information generating apparatus 1 of Example 4 will be described. The log-level determining process and history-information generating process of Embodiment 4 are the same as those of Example 1, so that the description thereof will be omitted while referring to Embodiment 1.

Figure 24:
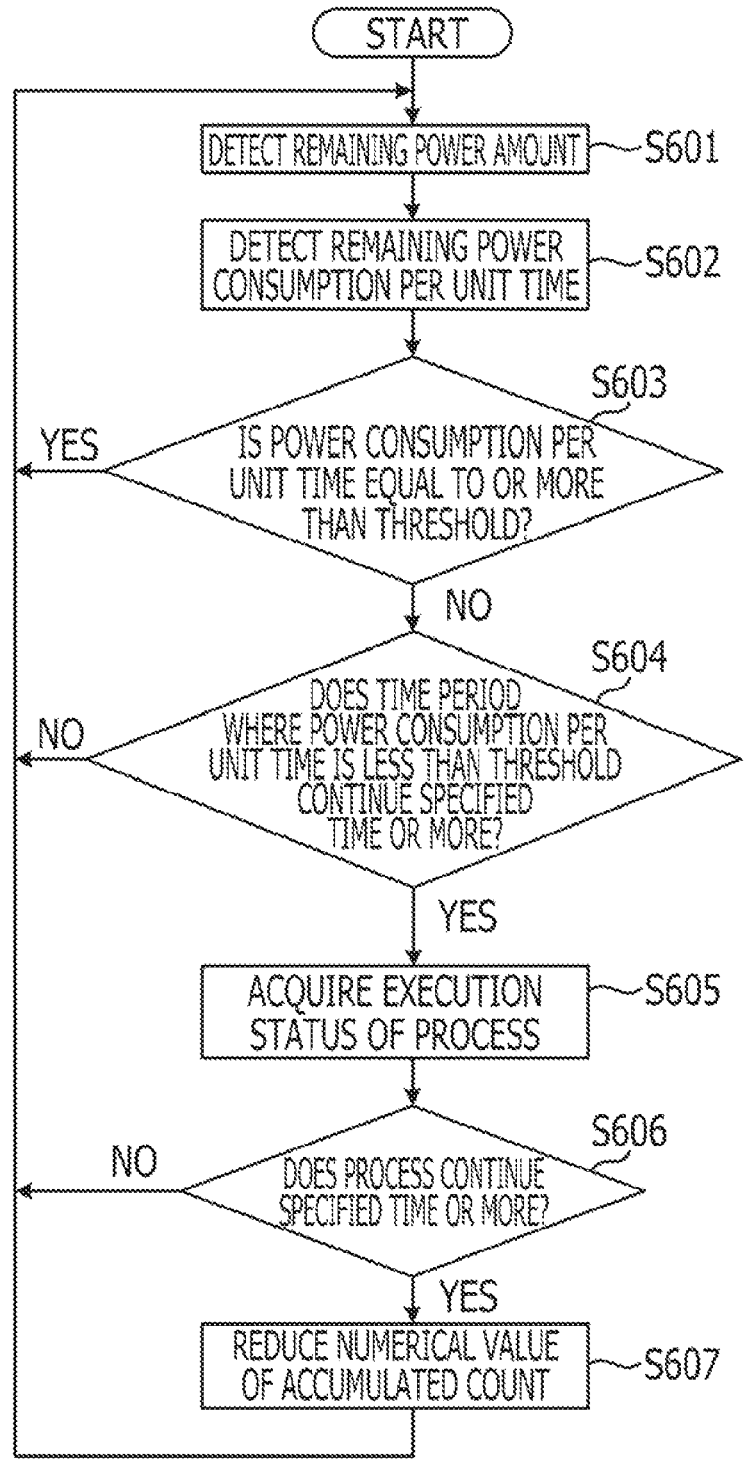
FIG. 24 is a flow chart illustrating an exemplary process for numerical subtraction the information generating apparatus according to Embodiment 4.

FIG. 24 is a flow chart illustrating an exemplary process for numerical subtraction the information generating apparatus according to Embodiment 4. The numerical subtraction process of Embodiment 4 carries out the subtraction on the accumulated point stored in the execution process database 111 depending on the situation to change the log level.

For example, the information generating apparatus 1 executes an information generating program PRG under the control of the control unit 10 to carry out the process for numerical subtraction as described below. The information generating apparatus 1 performs the process for numerical subtraction after start-up. In other words, the execution of the process for numerical subtraction is triggered by initiating the passage of electric current from the battery of the power unit 13 to the process executing part 100.

The power detecting part 101 detects the remaining power amount of the battery housed in the power unit 13 (S601). The power detecting part 101 detects power consumption per unit time (S602), the consumption determining part 102 determines whether the power consumption per unit time is equal to or more than a specified threshold value (S603). The procedures in S601 to S603 correspond to the procedures in S101 to S103 of the log-level determining process of Embodiment 1 as described with reference to FIG. 18. In addition, S601 to S603 detect whether an increase in power consumption occurs. Therefore, instead of the procedures in S601 to S603, the procedures in S402 to S504 of the long-level determining process of Embodiment 2 as described with reference to FIG. 18 may be executed.

In S603, if the consumption determining part 102 determines that the power consumption per unit time is equal to or more than the threshold value (YES in S603), the process returns to S601 and the subsequent processes are repeated.

In S603, if the consumption determining part 102 determines that the power consumption is equal to or more than the threshold value (NO in S603), the consumption determining part 102 determines whether the sustained time period during which the power consumption is less than the threshold is equal to or more than a specified period of time (S604). In S604, for example, the consumption determining part 102 starts a time check after carrying out the process and it is determined that the power consumption is equal to or more than a specified threshold in S603. In this case, the sustained time period may be determined by initialization of the time check.

In S604, if the consumption determining part 102 determines that the sustained time period during which the power consumption is less than the threshold is less than the specified period of time (NO in S604), the process returns to S601 and the subsequent processes are repeated.

In S604, if the consumption determining part 102 determines that the sustained time period during which the power consumption is less than the threshold is equal to or more than the specified time (YES in S604), the status acquiring part 103 acquires the execution status of the process carried out by the process executing unit 100 (S605).

The history-information generating part 104 determines whether the process in execution is successively performed during the period of time equal to or more than the specified time (S606). In S606, for example, the numeral management part 105 calculates the time elapsed from the execution start time with reference to the log database 110 and then makes comparison with the specified time.

Therefore, it is possible to determine whether the process in execution is successively performed during the period of time equal to or more than the specified time.

In S606, if it is determined that the numeral management part 105 is successively performed during the period of time equal to or more than the specified time (YES in S606). The numeral management part 105 performs subtraction on the numerical value of the accumulated point associated with the process in execution with respect to the execution process database 111 (S607). As a numerical value of the accumulated point to be subtracted, a suitably defined numerical value, such as a fixed value, a variable value defined based on the duration time, a numerical value equal to the accumulated point (initialization), or a numerical value corresponding to a specified rate of the accumulated point, may be suitably employed. In addition to the subtraction on the accumulated point, the process for changing a log level depending on the accumulated point after the subtraction is carried out. Then, the process returns to S601 and the subsequent processes are repeated.

In S606, if the numeral management part 105 determines that the process in execution is not successively performed not less than the specified time (NO in S606), the process returns to S601 and the subsequent processes are repeated.

As described above, in Embodiment 4, the period of time where the power amount is equal to or more than the specified threshold is continued for not less than a specified time after passage of current. In addition, if there is a process successively continued not less than the specified time, the control unit 10 performs subtraction on the accumulated point. Therefore, if the power consumption does not reach to the specified value or more even if any process is being carried out, the numeral management part 105 determines that the execution of the process is stable. Thus, the log level may be lowered. Therefore, if the power consumption due to the execution of the process is stabilized by restart, the numeral management part 105 checks off such a process from the analysis to reduce the number of operation processes required for analysis and repair.

Here, the process for numerical subtraction is a process aiming at lowering the log level of the process when such a process is stabilized by restart. Therefore, after the restart, the process load may be reduced by successively carrying out the process for numerical subtraction until the specified time is passed. In addition, the reference-state determining part 106 determines whether the specific process is carried out in high-speed movement, voice conversation, data communication, or the like. The numeral management part 105 may carry out the process for numerical subtraction as long as it does not perform the specific execution process. Furthermore, instead of carrying out the restart, the process for numerical subtraction may be started at an appropriate specified timing, for example, after completing battery charge.

Here, in each of Embodiments 1 to 4, the example of the power detecting part 101 in which the power consumption of a battery is detected based on the power amount of the battery. Alternatively, the power detecting part 101 may detect the amount of current passed and detect the generation of an abnormal power consumption of the battery when the amount of current passed is equal to or more than the specified threshold.

Each of Embodiments 1 to 4 as described above is only illustrated as part of the infinite number of embodiments. The configurations of various kinds of hardware, software, and so on may be suitably changed according to the purpose, use, or the like. For example, if is the above are applied to a personal computer, the control unit 10 may store a history about communication as history information. Thus, it is possible to use such a history in analysis when the power consumption is increased by a computer virus infected through a communication network, hacking, or external operation. Furthermore, Embodiments 1 to 4 as described above are not only executed independently. Alternatively, they may be executed in suitable combination depending on the object and usage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information generating apparatus, comprising:
a memory; and
a processor coupled to the memory, wherein the processor executes
an executing procedure that executes at least one process using a battery as a power source,
a detecting procedure that detects power consumption of the battery,
a determining procedure that determines whether the power consumption is equal to or more than a threshold,
a specifying procedure that specifies a process executed by the executing procedure when the power consumption is equal to or more than the specified threshold, and
a generating procedure that generates execution state information including a record of events arising upon executing the process specified by the specifying procedure.

2. The information generating apparatus according to claim 1, wherein
the detecting procedure detects the power consumption of the battery based on a remaining power amount of the battery.

3. The information generating apparatus according to claim 1, wherein
the detecting procedure detects the power consumption of the battery based on a current amount of the battery.

4. The information generating apparatus according to claim 1, wherein the processor further executes:
a reference-state determining procedure that determines whether the information generating apparatus is in a reference state; and
a reference-consumption calculating procedure that calculates a central value of the power consumption of the battery as reference consumption during a period of time where the the information generating apparatus is in a reference state, wherein
the determining procedure determines whether the power consumption with respect to the reference consumption is equal to or more than a threshold.

5. The information generating apparatus according to claim 1, wherein the processor further executes:
a communication procedure that establishes a wireless connection with one communication base station among a plurality of communication base stations;
a reference-state determining procedure that determines a reference state of the information generating apparatus based on a number of communication base stations connected to within a specified period of time by the wireless connection process; and
a reference-consumption calculating procedure that calculates the central value of the power consumption of the battery as reference consumption during a period of time where the information generating apparatus is in a reference state, wherein
the determining procedure determines whether the power consumption with respect to the reference consumption is equal to or more than a specified threshold.

6. The information generating apparatus according to claim 1, wherein the processor further executes:
a recording procedure that records a point while associating the point with a process executed by the executing procedure; and
a numeral management procedure that adds a specified numerical value to the point recorded on the recording procedure while associating the point with a process specified by the specifying procedure based on an execution state of the specified process, wherein
if the point recorded in the recording procedure reaches any of two or more different reference specified values, the recording procedure generates state information in a form depending on the reached reference value.

7. The information generating apparatus according to claim 6, wherein the processor further executes:
a second recording procedure that records a numerical value depending on a state of the information generating apparatus; and
a local apparatus state determining procedure that determines an execution state of a specific process, wherein
the numeral management procedure adds a numerical value depending on the state of the specific process determined by the local apparatus state determining procedure to a point recorded in the recording procedure while associating the point to the process specified by the specifying procedure based on the execution status of the specified process.

8. The information generating apparatus according to claim 6, wherein
the numeral management procedure performs subtraction on a numerical value recorded on the recording procedure while associating the point to a process successively executed for a specified time or more, in which a period of time where the consumption is less than a specified threshold is continued not less than a specified time.

9. The information generating apparatus according to claim 6, wherein the processor further executes:
a transmission procedure that transmits the state information generated by the generating procedure when a numerical value recorded in the recording procedure reaches a specified value.

10. A method for generating information, comprising:
detecting, using a processor, a power consumption of a battery;
determining whether the power consumption is equal to or more than a threshold;
acquiring an execution state of a process in execution when the consumption per unit time is determined to be more than a specified consumption; and
generating the execution state information including a record of events arising upon execution of the process.

* * * * *